US012574165B2

(12) United States Patent
Sugaya

(10) Patent No.: US 12,574,165 B2
(45) Date of Patent: Mar. 10, 2026

(54) COMMUNICATION DEVICE AND COMMUNICATION METHOD FOR TRANSMITTING AND RETRANSMITTING DATA VIA AN AGGREGATED FRAME

(71) Applicant: Sony Group Corporation, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 347 days.

(21) Appl. No.: 18/261,268

(22) PCT Filed: Dec. 24, 2021

(86) PCT No.: PCT/JP2021/048266
§ 371 (c)(1),
(2) Date: Jul. 13, 2023

(87) PCT Pub. No.: WO2022/163265
PCT Pub. Date: Aug. 4, 2022

(65) Prior Publication Data
US 2024/0072943 A1 Feb. 29, 2024

(30) Foreign Application Priority Data
Jan. 27, 2021 (JP) ................................. 2021-011271

(51) Int. Cl.
*H04L 1/1829* (2023.01)
(52) U.S. Cl.
CPC .................................. *H04L 1/1858* (2013.01)

(58) Field of Classification Search
CPC ........... H04L 1/1858; H04L 2001/0092; H04L 1/1614; H04L 1/1864; H04L 1/1685; H04W 84/12
See application file for complete search history.

(56) References Cited

U.S. PATENT DOCUMENTS 9,185,045 B1 * 11/2015 Yang ................. H04W 28/0289
2006/0092871 A1 * 5/2006 Nishibayashi .......... H04L 1/188
370/477

(Continued)

FOREIGN PATENT DOCUMENTS

JP 2006-129393 A 5/2006
JP 2011-125035 A 6/2011
WO 2018/008237 A1 1/2018

OTHER PUBLICATIONS

Chunyu Hu, "A Bar Variant For Multi-Link Operation", IEEE 802.11-20/0122r4, Apr. 27, 2020, 6 pages.

(Continued)

*Primary Examiner* — Ivan O Latorre
(74) *Attorney, Agent, or Firm* — XSENSUS LLP

(57) ABSTRACT

A method and a corresponding communication device that includes a control circuitry that performs control to: exchange frames with another communication device by wireless communication using a plurality of links; when transmitting a data frame including aggregated data using a first link, transmit an acknowledgment request frame for the data, using a second link; and receive an acknowledgment frame in response to the acknowledgment request frame from the another communication device that has received the data frame. The present technology can be applied to communication devices that constitute a wireless LAN system, for example.

18 Claims, 24 Drawing Sheets

(56) References Cited

U.S. PATENT DOCUMENTS

| | | | |
|---|---|---|---|
| 2009/0147719 A1* | 6/2009 | Kang | H04L 12/189 |
| | | | 370/312 |
| 2015/0036673 A1* | 2/2015 | Asterjadhi | H04W 28/065 |
| | | | 370/338 |
| 2019/0229876 A1* | 7/2019 | Sugaya | H04L 1/1877 |
| 2022/0287122 A1* | 9/2022 | Wang | H04W 8/22 |
| 2022/0345247 A1* | 10/2022 | Guo | H04L 69/14 |
| 2023/0011167 A1* | 1/2023 | Chitrakar | H04W 76/15 |
| 2024/0022956 A1* | 1/2024 | Sugaya | H04L 1/1628 |
| 2024/0072943 A1* | 2/2024 | Sugaya | H04L 1/1864 |

OTHER PUBLICATIONS

Rojan Chitrakar et al., "Multi-link Block Ack Architecture", IEEE 802.11-20/0055r2, Jan. 2020, 10 pages.

Chitrakar et al., "Multi-link transmission", doc.: IEEE 802.11-19/1128r0, Accessed from Internet https://mentor.ieee.org/802.11/dcn/19/11-19-1128-00-00be-multi-link-transmission.pptx, Jul. 12, 2019, 8 pages.

International Search Report and Written Opinion mailed on Mar. 22, 2022, received for PCT Application PCT/JP2021/048266, filed on Dec. 24, 2021, 9 pages including English Translation.

* cited by examiner

TIME

| MAC Header | | | | BAR Information | | | | |
|---|---|---|---|---|---|---|---|---|
| Frame Control | Duration | Receive Address | Transmit Address | BAR Control (M-BAR) | Starting Sequence No. | Multi-Link Info | Block ACK Bitmap Length | Discard S/N | FCS |

| BAR Ack Policy | BAR Type | Reserved | TID_INFO |
|---|---|---|---|

*FIG. 13*

| BAR Type | Block Ack Req frame variant |
|----------|------------------------------|
| 0 | Reserved |
| 1 | Extended Compressed |
| 2 | Compressed |
| 3 | Multi-TID |
| 4~5 | Reserved |
| 6 | GCR |
| 7~9 | Reserved |
| 10 | GLK-GCR |
| 11 | M-BAR |
| 12~15 | Reserved |

*FIG. 16*

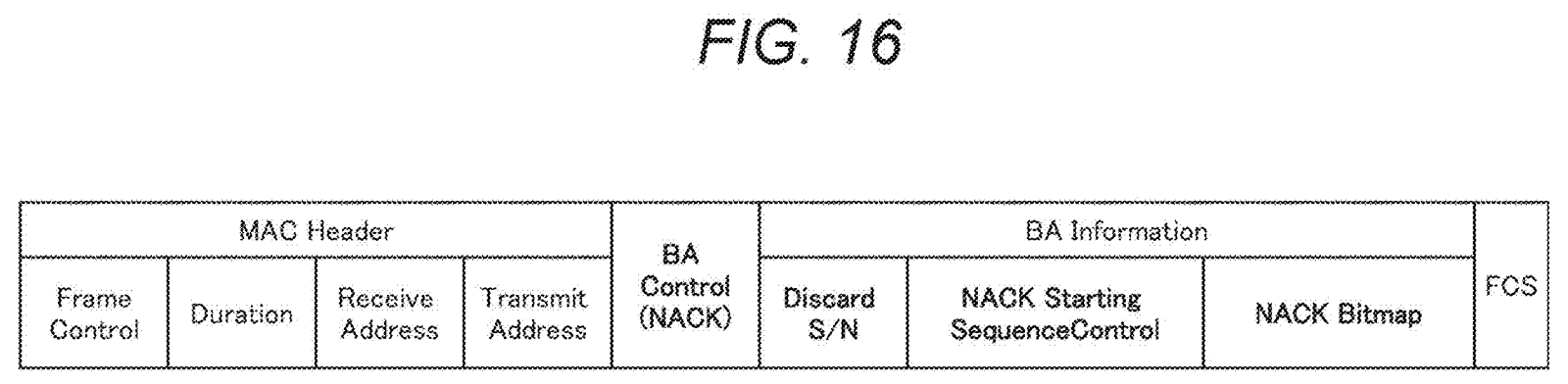

| MAC Header | | | BA Control (NACK) | BA Information | | | FCS |
|---|---|---|---|---|---|---|---|
| Frame Control | Duration | Receive Address | Transmit Address | | Discard S/N | NACK Starting SequenceControl | NACK Bitmap |

*FIG. 17*

| MAC Header | | | BA Control (MLNACK) | BA Information | | | | FCS |
|---|---|---|---|---|---|---|---|---|
| Frame Control | Duration | Receive Address | Transmit Address | | Discard S/N | NACK Counts | NACK Sequence Number | ... | |

*FIG. 18*

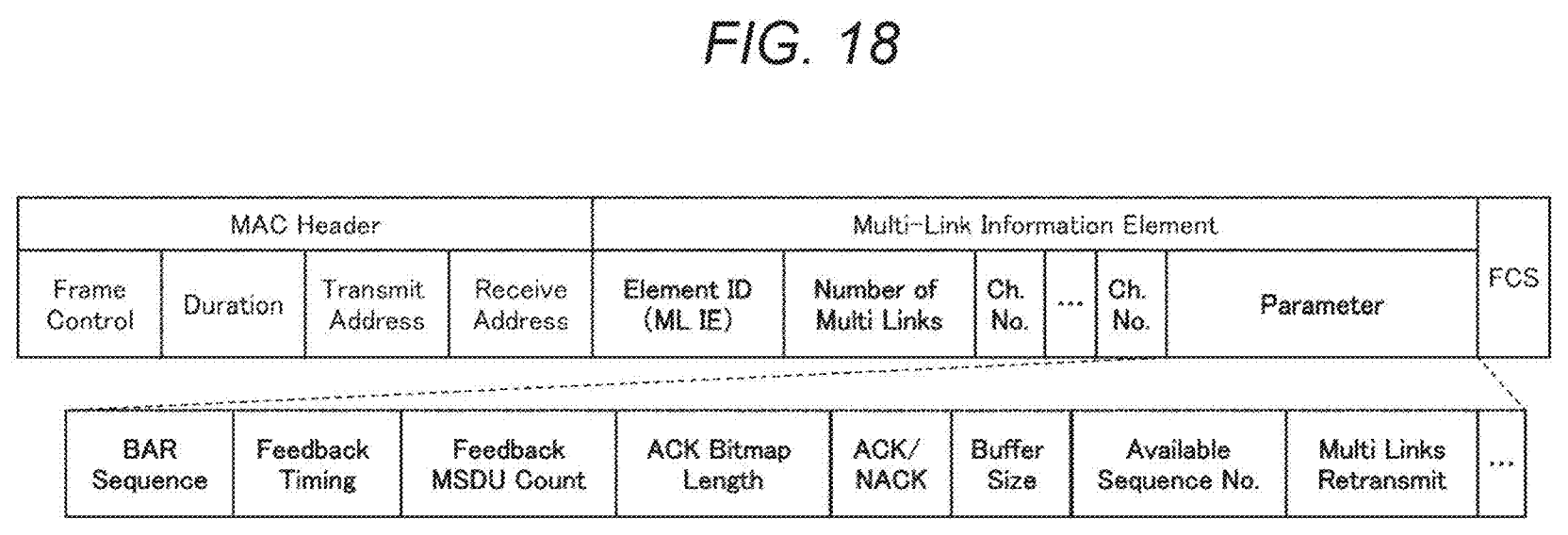

| MAC Header | | | | Multi-Link Information Element | | | | | | |
|---|---|---|---|---|---|---|---|---|---|---|
| Frame Control | Duration | Transmit Address | Receive Address | Element ID (ML IE) | Number of Multi Links | Ch. No. | ... | Ch. No. | Parameter | FCS |

| BAR Sequence | Feedback Timing | Feedback MSDU Count | ACK Bitmap Length | ACK/ NACK | Buffer Size | Available Sequence No. | Multi Links Retransmit | ... |
|---|---|---|---|---|---|---|---|---|

Figure 20:
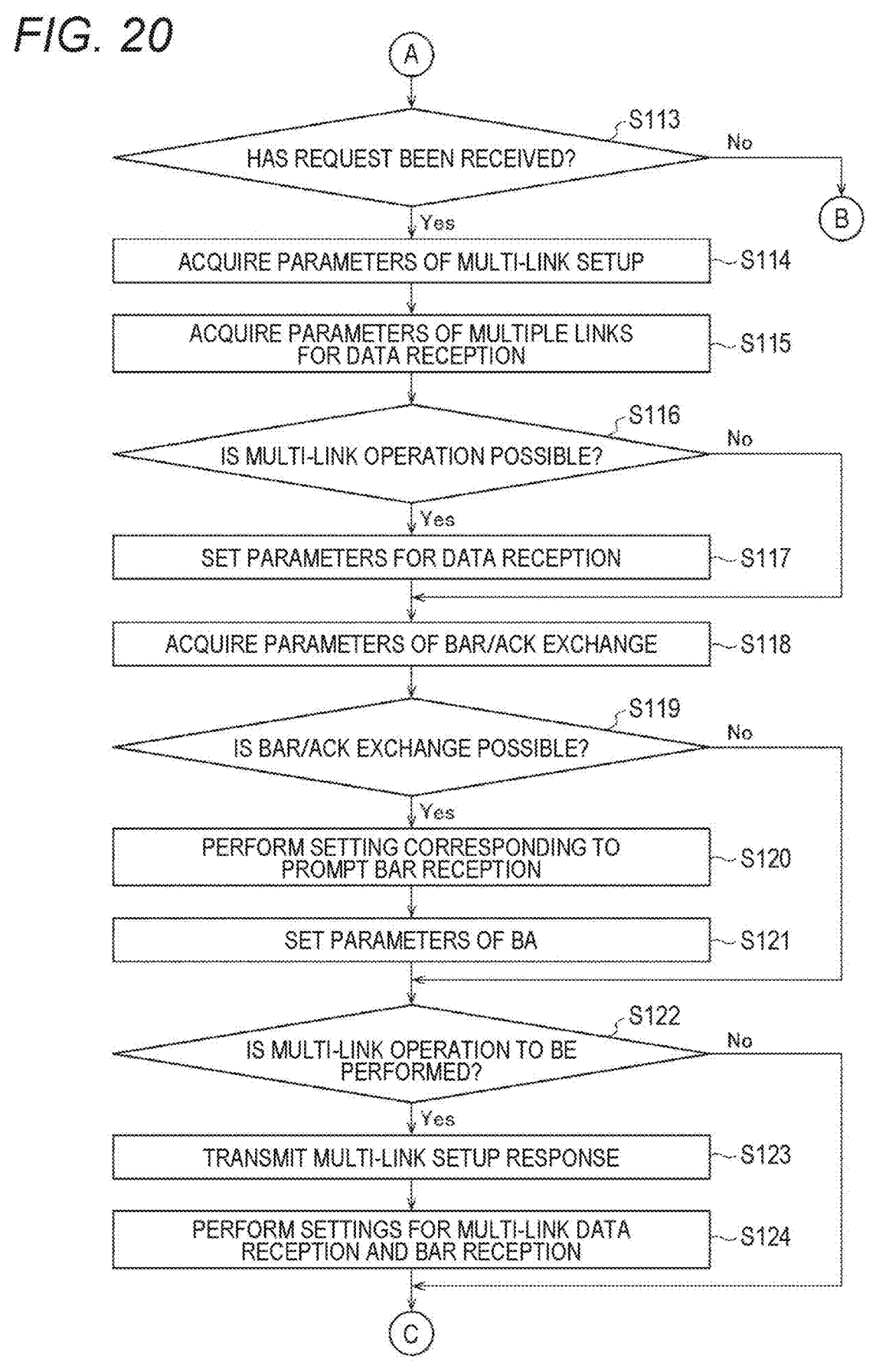

S113
HAS REQUEST BEEN RECEIVED? ──No──→ Ⓑ

│Yes

ACQUIRE PARAMETERS OF MULTI-LINK SETUP ──S114

ACQUIRE PARAMETERS OF MULTIPLE LINKS FOR DATA RECEPTION ──S115

S116
IS MULTI-LINK OPERATION POSSIBLE? ──No──┐

│Yes

SET PARAMETERS FOR DATA RECEPTION ──S117

ACQUIRE PARAMETERS OF BAR/ACK EXCHANGE ──S118

S119
IS BAR/ACK EXCHANGE POSSIBLE? ──No──┐

│Yes

PERFORM SETTING CORRESPONDING TO PROMPT BAR RECEPTION ──S120

SET PARAMETERS OF BA ──S121

S122
IS MULTI-LINK OPERATION TO BE PERFORMED? ──No──┐

│Yes

TRANSMIT MULTI-LINK SETUP RESPONSE ──S123

PERFORM SETTINGS FOR MULTI-LINK DATA RECEPTION AND BAR RECEPTION ──S124

Ⓒ

COMMUNICATION DEVICE AND COMMUNICATION METHOD FOR TRANSMITTING AND RETRANSMITTING DATA VIA AN AGGREGATED FRAME

CROSS-REFERENCE TO RELATED APPLICATIONS

This application is based on PCT filing PCT/JP2021/048266, filed Dec. 24, 2021, which claims priority to Japanese Application No. 2021-011271, filed Jan. 27, 2021, the entire contents of each are incorporated herein by reference.

TECHNICAL FIELD

The present technology relates to a communication device and a communication method, and more particularly, to a communication device that enables identifying of data that needs to be retransmitted at an earlier stage, and a communication method.

BACKGROUND ART

In a wireless local area network (LAN) system, control is performed so that a block ACK request frame is transmitted at any timing after data transmission from the transmission-side communication device, and the reception-side communication device that receives the data returns a block ACK frame.

Patent Document 1 discloses a technique for transmitting a block ACK request frame including a transmission sequence number (TSN) to indicate to which data block among a plurality of data blocks the block ACK frame corresponds.

Further, for wireless LAN systems, a technique by which a plurality of MAC layer protocol data units (MPDUs) is aggregated to form an aggregation MPDU (A-MPDU) frame as one frame to transmit data is widely used.

CITATION LIST

Patent Document

Patent Document 1: Japanese Patent Application Laid-Open No. 2011-125035

SUMMARY OF THE INVENTION

Problems to be Solved by the Invention

In a case where frame aggregation is performed, the reception-side communication device cannot return a block ACK frame unless the end of an A-MPDU frame arrives, and the transmission-side communication device cannot identify the data that needs to be retransmitted.

Therefore, the data that needs to be retransmitted by the transmission-side communication device cannot be identified unless all the data has already been transmitted. Because of this, it takes time to determine the data that has not been delivered to the reception-side communication device, and it takes time to retransmit the data that has not been delivered.

Furthermore, by the technique disclosed in Patent Document 1, it is not possible to return a block ACK frame including the latest data reception status.

The present technology has been made in view of such circumstances, and is to enable identifying of data that needs to be retransmitted at an earlier stage.

Solutions to Problems

A communication device according to one aspect of the present technology is a communication device that includes a control unit that performs control to: exchange frames with another communication device by wireless communication using a plurality of links; when transmitting a data frame including aggregated data using a first link, transmit an acknowledgment request frame for the data, using a second link; and receive an acknowledgment frame in response to the acknowledgment request frame from the other communication device that has received the data frame.

A communication method according to one aspect of the present technology is a communication method implemented by a communication device to: exchange frames with another communication device by wireless communication using a plurality of links; when transmitting a data frame including aggregated data using a first link, transmit an acknowledgment request frame for the data, using a second link; and receive an acknowledgment frame in response to the acknowledgment request frame from the other communication device that has received the data frame.

In a communication device and a communication method according to one aspect of the present technology, frame exchange with another communication device is performed by wireless communication using a plurality of links. When a data frame including aggregated data is transmitted with a first link, an acknowledgment request frame for the data is transmitted with a second link, and an acknowledgment frame in response to the acknowledgment request frame is received from the other communication device that has received the data frame.

A communication device according to one aspect of the present technology is a communication device that includes a control unit that performs control to: exchange frames with another communication device by wireless communication using a plurality of links; when receiving a data frame including aggregated data using a first link from another communication device, receive an acknowledgment request frame for the data, using a second link; generate an acknowledgment frame including an acknowledgment of the data that has been collected, on the basis of the received acknowledgment request frame; and transmit the generated acknowledgment frame to the other communication device that has transmitted the data frame.

A communication method according to one aspect of the present technology is a communication method implemented by a communication device to: exchange frames with another communication device by wireless communication using a plurality of links; when receiving a data frame including aggregated data using a first link from another communication device, receive an acknowledgment request frame for the data, using a second link; generate an acknowledgment frame including an acknowledgment of the data that has been collected, on the basis of the received acknowledgment request frame; and transmit the generated acknowledgment frame to the other communication device that has transmitted the data frame.

In a communication device and a communication method according to one aspect of the present technology, frame exchange with another communication device is performed by wireless communication using a plurality of links. When a data frame including aggregated data is received with a first link from another communication device, an acknowledgment request frame for the data is received with a second link. An acknowledgment frame including an acknowledgment of the data that has been collected is generated on the basis of the received acknowledgment request frame, and the generated acknowledgment frame is transmitted to the other communication device that has transmitted the data frame.

Note that a communication device according to one aspect of the present technology may be an independent device, or may be an internal block forming one device.

BRIEF DESCRIPTION OF DRAWINGS

FIG. 5 is a diagram showing a flow of data transmission during a multi-link operation to which the present technology is applied.

FIG. 6 is a diagram showing a first modification of the flow of data transmission during a multi-link operation to which the present technology is applied.

FIG. 7 is a diagram showing a second modification of the flow of data transmission during a multi-link operation to which the present technology is applied.

FIG. 8 is a diagram showing a third modification of the flow of data transmission during a multi-link operation to which the present technology is applied.

FIG. 12 is a diagram showing an example configuration of a block ACK request frame to which the present technology is applied.

FIG. 13 is a diagram showing an example of BAR Type.

FIG. 16 is a diagram showing a first modification of the configuration of a block ACK frame to which the present technology is applied.

FIG. 17 is a diagram showing a second modification of the configuration of a block ACK frame to which the present technology is applied.

FIG. 18 is a diagram showing an example configuration of a frame in which a multi-link operation is replaced with a setup operation.

Figure 19:
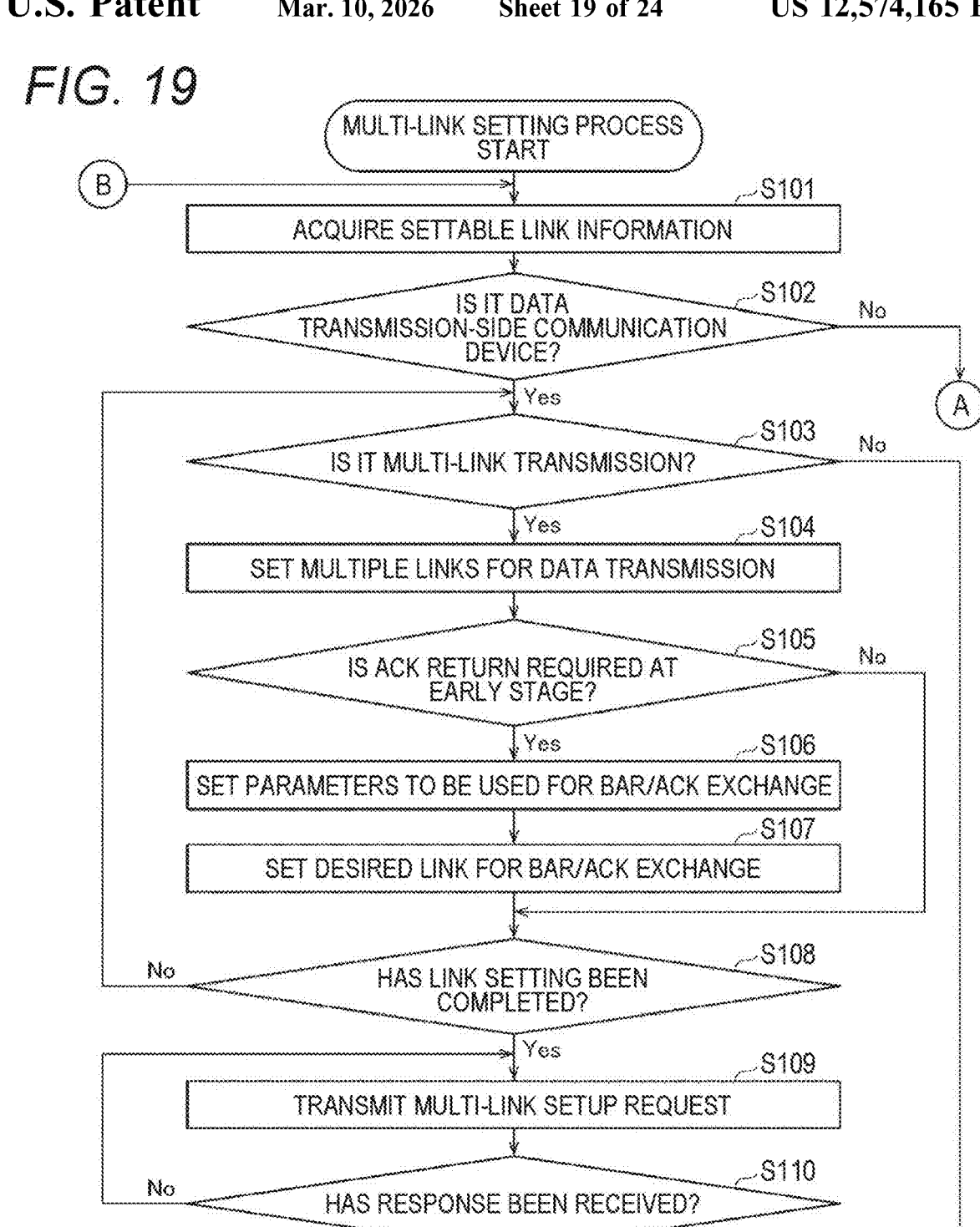

FIG. 19 is a flowchart for explaining a flow of a multi-link setting process.

FIG. 20 is a flowchart for explaining a flow of a multi-link setting process.

Figure 21:
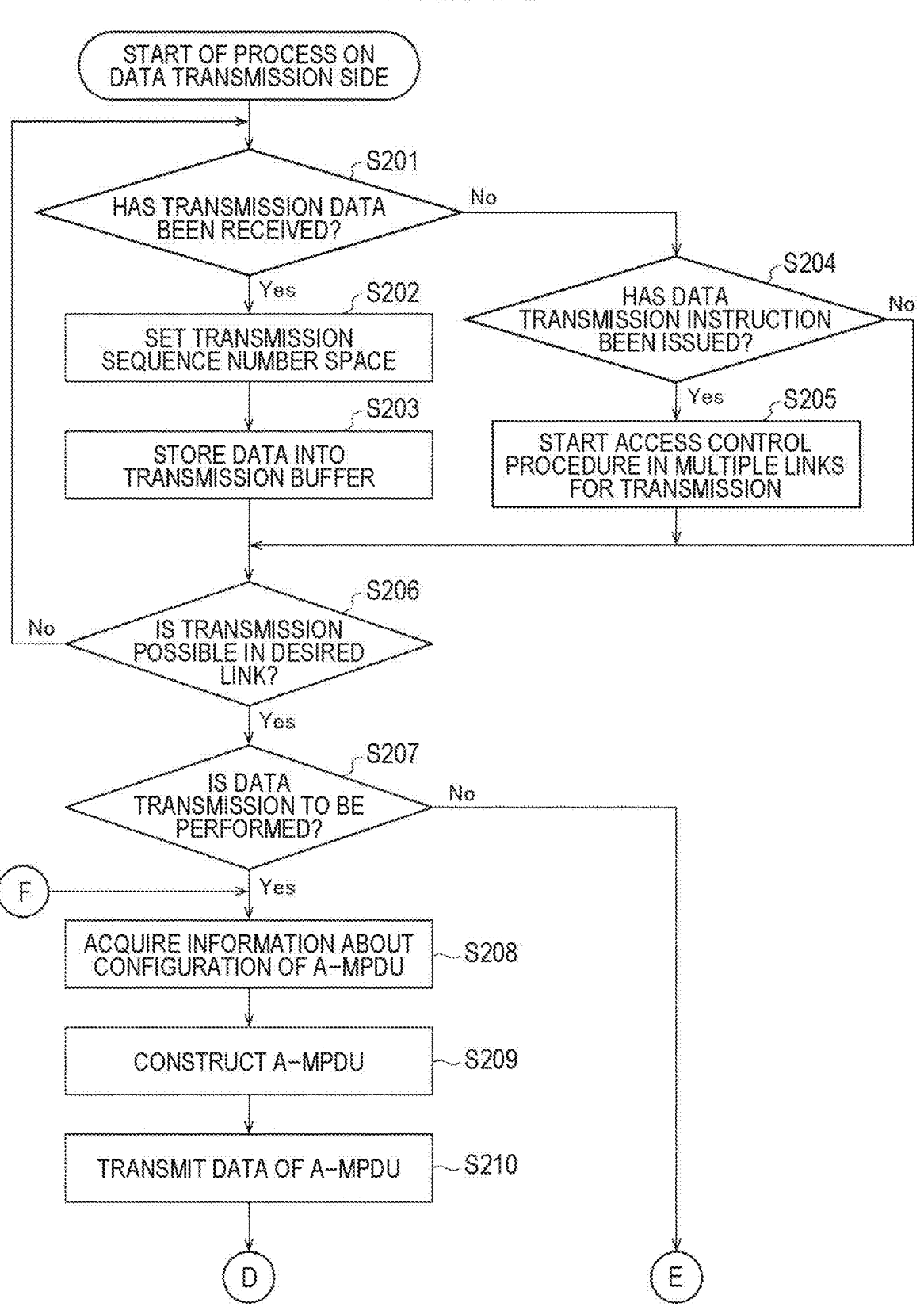

FIG. 21 is a flowchart for explaining a flow of a process on the data transmission side.

Figure 22:
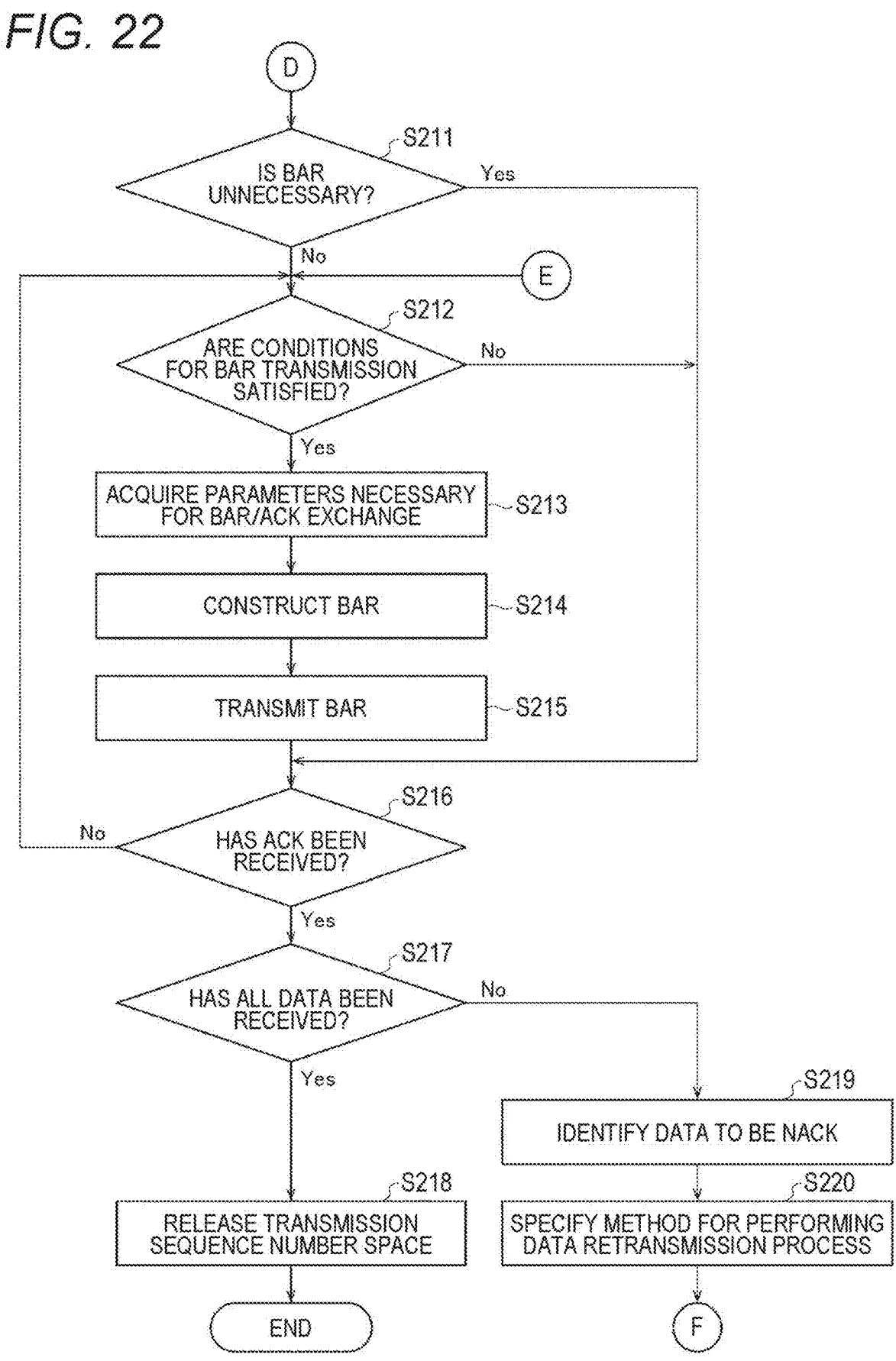

FIG. 22 is a flowchart for explaining a flow of a process on the data transmission side.

Figure 23:
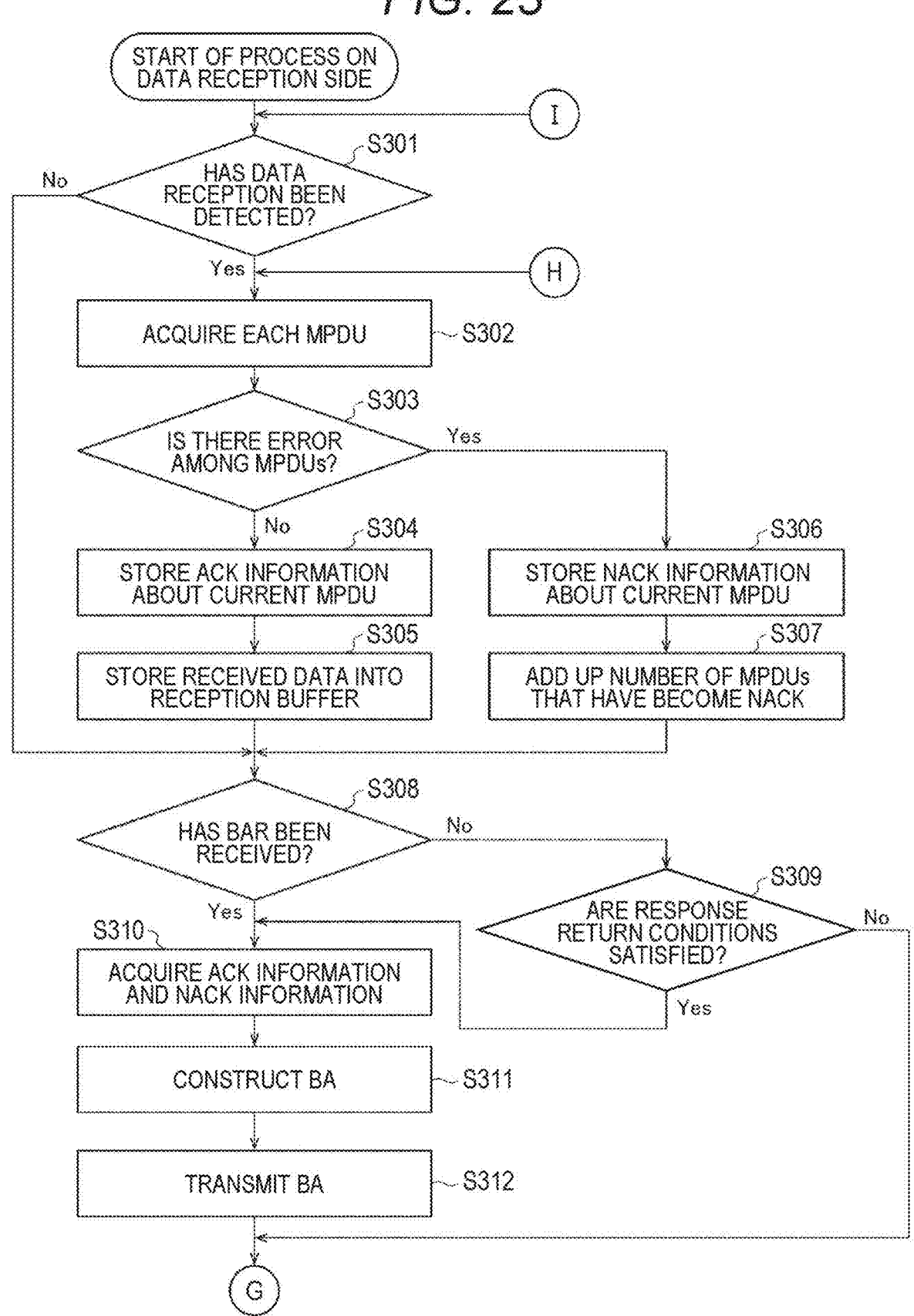

FIG. 23 is a flowchart for explaining a flow of a process on the data reception side.

Figure 24:
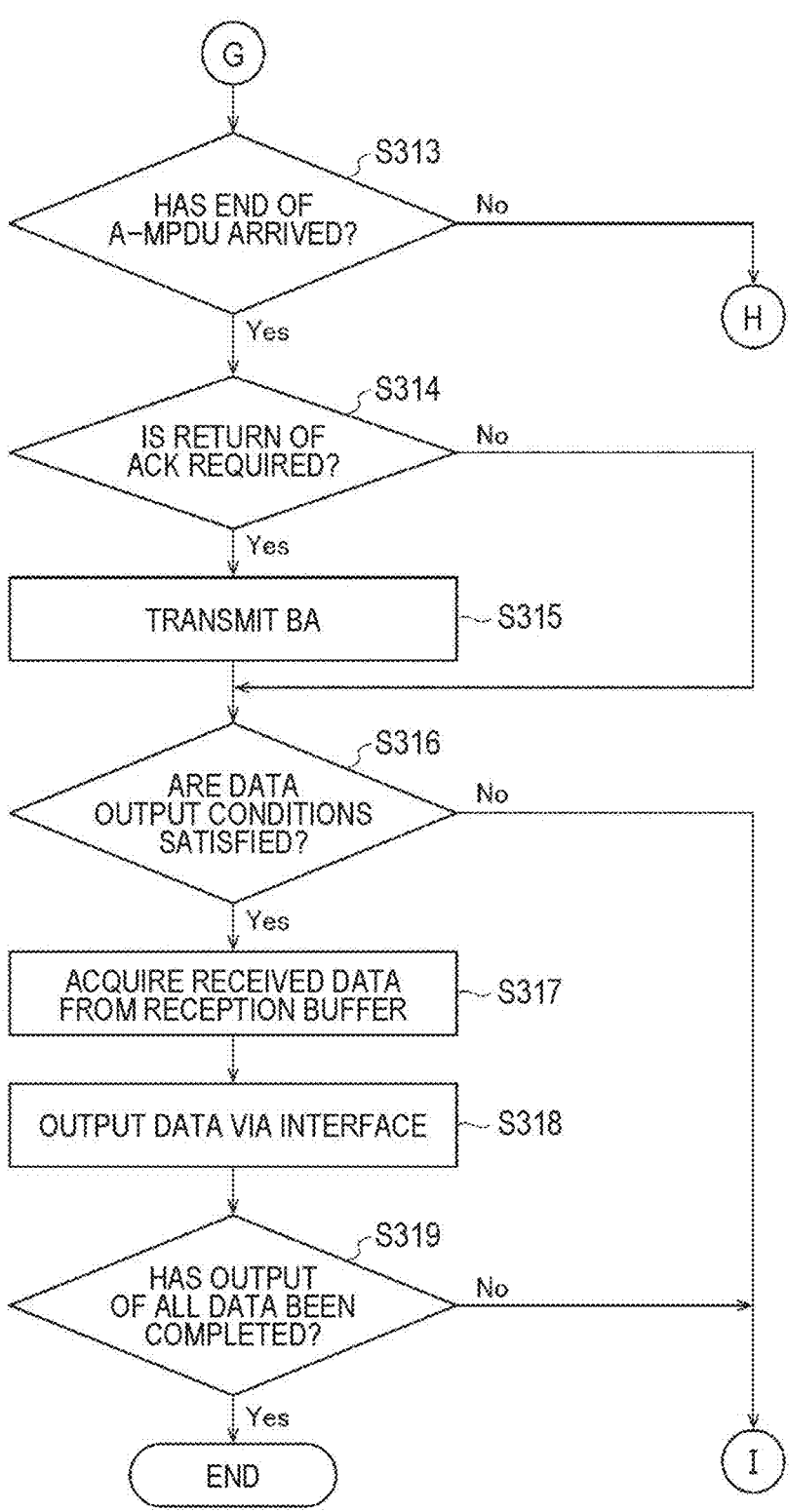

FIG. 24 is a flowchart for explaining a flow of a process on the data reception side.

MODES FOR CARRYING OUT THE INVENTION

In a conventional wireless LAN system, control is performed to transmit a block ACK request frame at any appropriate timing after data transmission, and return a block ACK frame of the transmitted data.

That is, in a case where receipt cannot be confirmed immediately after a short inter frame space (SIFS) interval has elapsed after data transmission in the channel in which the data was transmitted, a block ACK request frame is transmitted from the data transmission-side communication device to the reception-side communication device after a sufficient time for decoding has elapsed, and thus, a return of a block ACK frame is requested.

Further, in a case where a block ACK frame has been returned from the reception-side communication device immediately after data transmission, but the transmission-side communication device cannot correctly decode the block ACK frame, it is also possible to transmit a block ACK request frame to the reception-side communication device and request a return of the block ACK frame again, before the transmission-side communication device transmits all the data.

The sequence of data transmission and a return of a block ACK frame, and the sequence of a return of a block ACK request frame and a block ACK after the data transmission are exchanged with the use of channels in the same frequency band.

Also, for wireless LAN systems standardized by IEEE 802.11n or IEEE 802.11ac, a technique by which a plurality of MAC layer protocol data units (MPDUs) is aggregated to form an aggregation MPDU (A-MPDU) frame as one frame to transmit data is widely used.

Further, with the recent spread of wireless LAN systems and the increase in content capacity, communication of a predetermined amount of data using channels in only one frequency band is becoming insufficient.

Therefore, as a technical study of a standard subsequent to IEEE 802.11ax, a method for performing higher-density data communication using a plurality of frequency bands (links) in parallel has been studied in "task group TG be" in Institute of Electrical and Electronics Engineers (IEEE).

In this "task group TG be", as a multi-link operation (MLO), a technique for collectively transmitting aggregated content from a transmission-side communication device to a reception-side communication device using a plurality of different frequency bands (links) has been studied. In this multi-link operation, there is a demand for a technique for regarding a plurality of frequency bands (links) as one transmission channel and using the transmission channel for communication.

Meanwhile, from the viewpoint of securing compatibility with conventional wireless LAN systems, if a transmission channel among a plurality of frequency bands (links) is being used, transmission using the frequency band (link) cannot be performed, and the timing at which transmission becomes possible varies with each frequency band (link).

Furthermore, since it is necessary to set a random back-off in each frequency band (link) herein, transmission is not started at the same time, depending on the set value of the random back-off, though the transmission channel is in an unused state.

In this multi-link operation, in a case where the transmission start timing varies, the transmission end timing also differs from each other, and therefore, the retransmission start timing also varies with each individual frequency band (link).

In a case where conventional frame aggregation is performed, a block ACK frame cannot be returned unless the end of an A-MPDU frame arrives, and the transmission-side communication device cannot identify the data to be retransmitted.

Therefore, the data that needs to be retransmitted cannot be identified unless all the data has already been transmitted. Because of this, it takes time to determine the data that has not been delivered to the reception-side communication device, and it takes time to retransmit the data that has not been delivered.

In view of this, there is a demand for a method by which the transmission-side communication device identifies the undelivered data at any appropriate timing, and grasps beforehand the data to be retransmitted, without receiving a block ACK frame returned immediately after the end of data. Also, there is a demand for a technique for identifying the range of required ACK information with a block ACK request frame.

In view of this, the present technology is to devise a configuration in which a data transmission-side communication device in a wireless LAN system transmits a block ACK request frame in any appropriate frequency band so that a block ACK frame from the reception-side communication device can be received at any appropriate timing without waiting for the end of aggregated data (A-MPDU), and a block ACK frame of the data that has been successfully collected by the timing in frequency bands including other frequency bands is returned from the reception-side communication device immediately after the transmission, so that undelivered data can be detected at an early stage.

Further, the present technology is to devise a configuration in which a block ACK request frame is transmitted in any appropriate link, to detect the presence of a link in which a data reception defect has unilaterally occurred, in a case where the link is used for data transmission by the transmission-side communication device, but the reception-side communication device cannot receive the data at all, for example.

The present technology is also to devise a configuration in which a block ACK request frame to be transmitted includes information related to a link including data for requesting a block ACK, information related to the range of sequence numbers from a sequence number that does not require a return of a block ACK to a sequence number for which a block ACK is to be returned, and information related to the bitmap length of a block ACK.

The following is a description of embodiments of the present technology, with reference to the drawings.

1. Embodiments of the Present Technology (Configuration of a Network)

Figure 1:
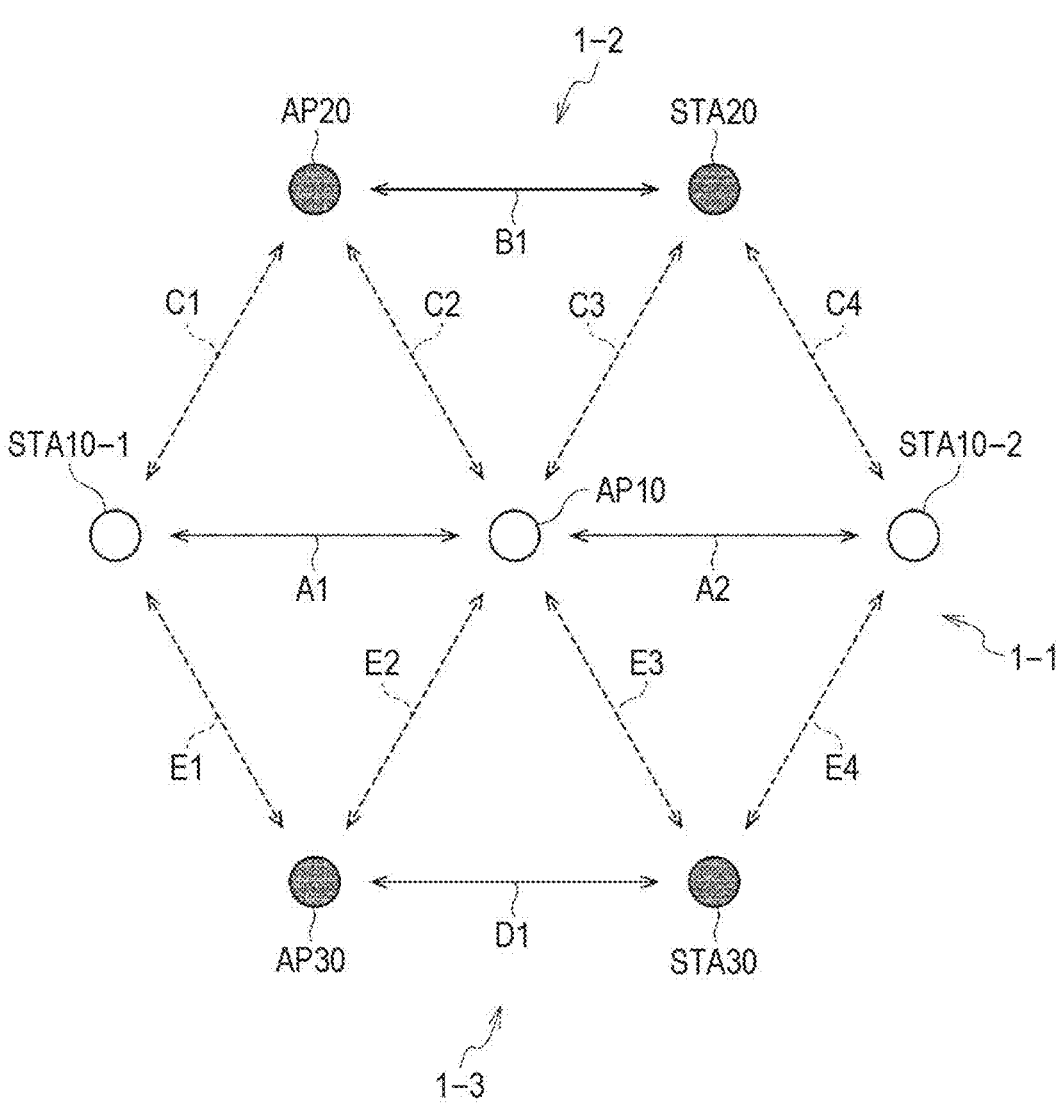
FIG. 1 is a diagram showing an example configuration of a wireless communication network formed with a wireless communication system to which the present technology is applied.

FIG. 1 is a diagram showing an example configuration of a wireless communication network formed with a wireless communication system to which the present technology is applied. FIG. 1 shows the configuration of a wireless LAN system as an example of a wireless communication system.

In FIG. 1, communication devices 10 constituting a wireless LAN system 1-1 are indicated by white circles in the drawing, and solid arrows A1 and A2 in the drawing indicate that the respective communication devices 10 are communicable in a state where a communication terminal STA10-1 and a communication terminal STA10-2 are connected to an access point AP10.

In the vicinity of the wireless LAN system 1-1, an access point AP20 and a communication terminal STA20 indicated by shaded circles in the drawing constitute another wireless LAN system 1-2, and a solid arrow B1 in the drawing indicates that the respective communication devices 20 are communicable.

Also, in the vicinity of the wireless LAN system 1-1, an access point AP30 and a communication terminal STA30 indicated by shaded circles in the drawing further constitute another wireless LAN system 1-3, and a solid arrow D1 in the drawing indicates that the respective communication devices 30 are communicable.

The access point AP10 is located at a position where signals from the access point AP20 and the communication terminal STA20, and signals from the access point AP30 and the communication terminal STA30 can be received, which are indicated by dashed arrows C2 and C3, and E2 and E3 in the drawing.

The communication terminal STA10-1 is located at a position where signals from the access point AP20 and the access point AP30 can be received, which are indicated by dashed arrows C1 and E1 in the drawing. Further, the communication terminal STA10-2 is located at a position where signals from the communication terminal STA20 and the communication terminal STA30 can be received, which are indicated by dashed arrows C4 and E4 in the drawing.

With this arrangement, the access point AP10, the communication terminal STA10-1, and the communication terminal STA10-2 constituting the wireless LAN system 1-1 need to perform fair access between these communication devices, because of the presence of the wireless LAN system 1-2 and the wireless LAN system 1-3.

Note that, hereinafter, a communication device that transmits data will be referred to as a transmission-side communication device, and a communication device that receives data will be referred to as a reception-side communication device. For example, in the wireless LAN system 1-1, data transmitted from a transmission-side communication device 10Tx such as the access point AP10 is received by a reception-side communication device 10Rx such as the communication terminal STA10-1.

Example of Frequency Band and Channel Allocation

Figure 2:
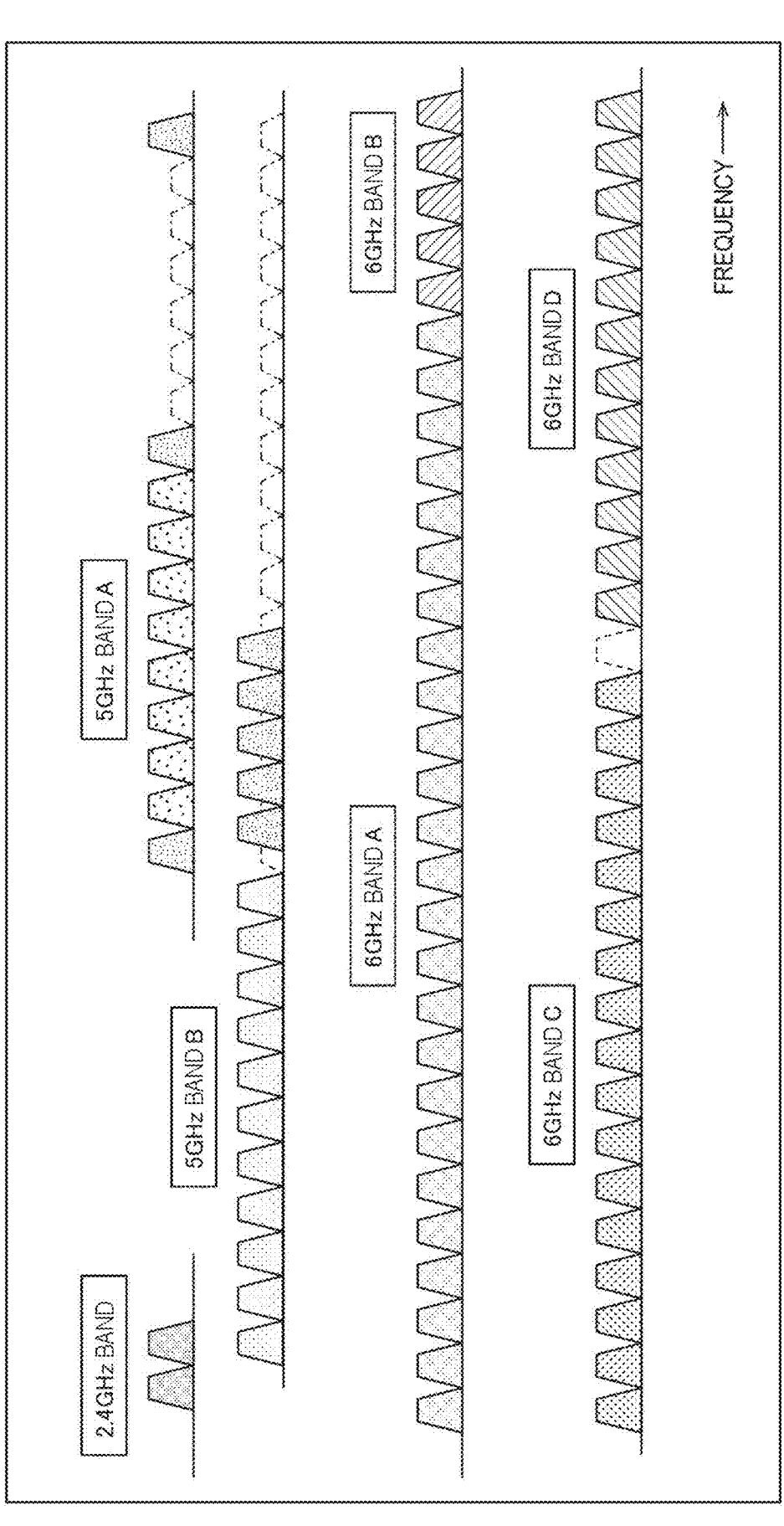
FIG. 2 is a diagram showing an example of frequency band and channel allocation that is used in a wireless communication system to which the present technology is applied.

FIG. 2 is a diagram showing an example of frequency band and channel allocation that is used in a wireless communication system to which the present technology is applied. FIG. 2 shows available frequency bands and channel allocation situations thereof for the wireless LAN system.

In the 2.4 GHz band, in a case of applying to a wireless signal of an orthogonal frequency division multiplexing (OFDM) scheme with the 20 MHz bandwidth in the IEEE 802.11g standard, frequencies for at least two channels are set ("2.4 GHz band" in the uppermost row (first row) in the drawing).

In the 5 GHz band, it is possible to secure a plurality of frequency channels to be applied to a wireless signal of the OFDM scheme with a 20 MHz bandwidth, according to a standard such as IEEE 802.11a ("5 GHz bands A and B" in the first and second rows in the drawing).

Here, operations in a 5 GHz band are accompanied with conditions for determining an available frequency range, transmission power, and transmission possibility in the legal systems of respective countries. For example, eight channels of channels 36 to 64, and 11 channels of channels 100 to 140 can be used in Japan.

Note that, in other countries and regions excluding Japan, channel 32, channel 68, channel 96, and channel 144 can also be used, and, in even higher frequency bands, channels 149 to 173 can further be used.

Furthermore, at present, 6 GHz bands are being standardized as available frequency bands ("6 GHz bands A, B, C, and D" in the third and fourth rows in the drawing). By the method of using 6 GHz bands, 25 channels can be arranged in the UNII-5 band of the 6 GHz band A, five channels can be arranged in the UNII-6 band of the 6 GHz band B, 17 channels can be arranged in the UNII-7 band of the 6 GHz band C, and 12 channels can be arranged in the UNII-8 band of the 6 GHz band D.

Example of Collision Between Data and an ACK

Figure 3:
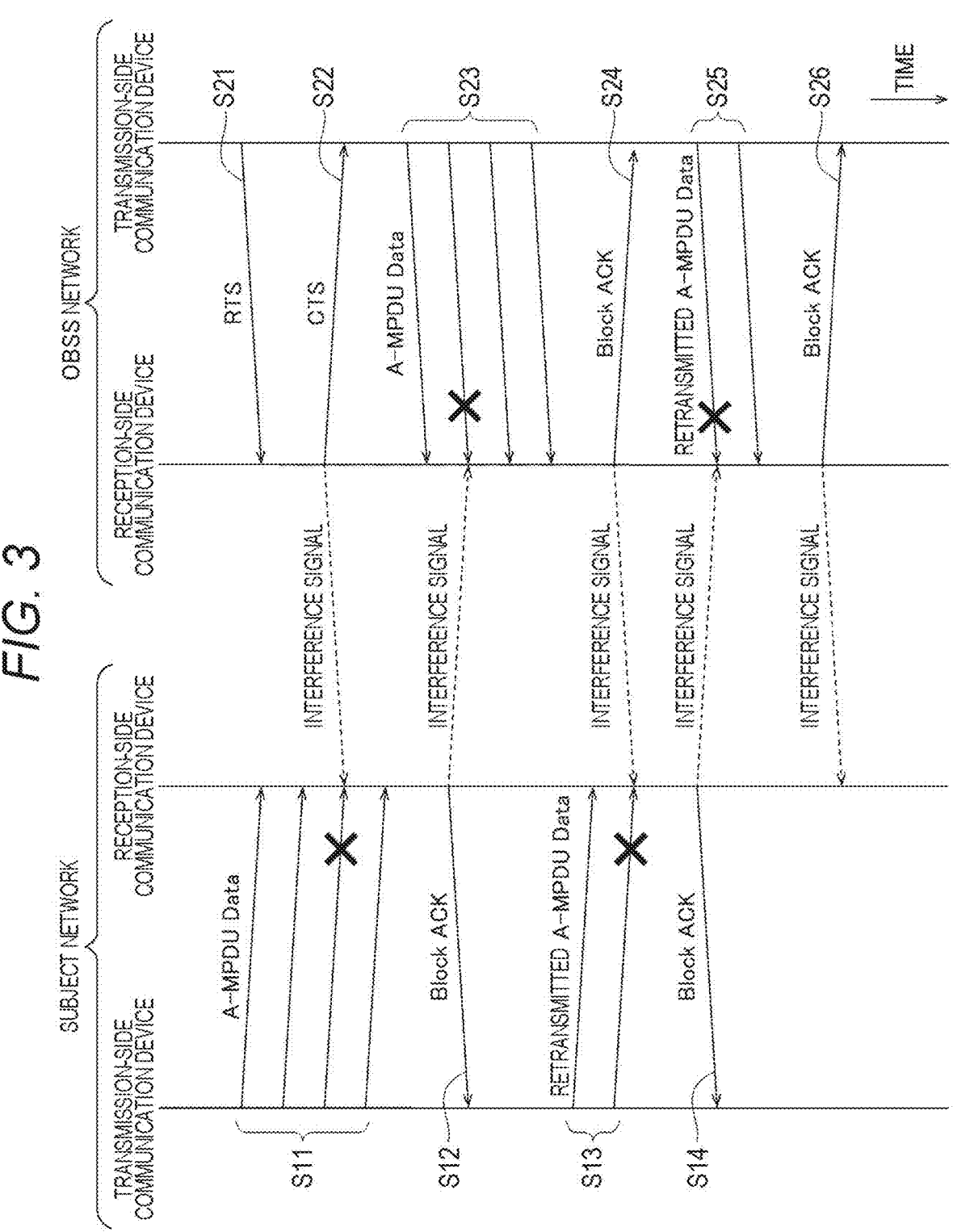
FIG. 3 is a sequence diagram showing an example of collision between data and ACK in a data exchange sequence according to the current method.

FIG. 3 is a sequence diagram showing an example of collision between data and an ACK in a data exchange sequence according to the current method.

By the current method, data transmission and ACK return are performed in the same channel. In view of this, FIG. 3 shows a case where a signal transmitted from a communication device of an adjacent network interferes with reception in the subject network, or an example in which a signal transmitted from the subject network interferes with reception at a communication device of an adjacent network.

In FIG. 3, the left side in the drawing shows a case where a transmission-side communication device and a reception-side communication device in the subject network are formed, and a reception-side communication device and a transmission-side communication device of an adjacent network (an overlapping basic service set (OBSS)) on the right side in the drawing are present.

Here, in the subject network, in a case where the reception-side communication device of the OBSS network returns a clear to send (CTS) frame corresponding to a request to send (RTS) frame while the reception-side communication device is receiving an A-MPDU frame (A-MPDU Data) from the transmission-side communication device, interference with data reception occurs, and correct data decoding cannot be performed (S11, S21, S22).

Therefore, even though the reception-side communication device of the OBSS network is receiving the data (A-MPDU Data), the reception-side communication device of the subject network returns a block ACK frame (Block ACK) immediately after the reception of the A-MPDU frame (A-MPDU Data) is completed (S12). In this case, the block ACK frame turns into an interference signal in the reception-side communication device of the OBSS network, and the data (A-MPDU Data) cannot be correctly received (S23).

Further, when data retransmitted from the transmission-side communication device of the subject network (retransmitted A-MPDU Data) overlaps with the timing of the block ACK frame (Block ACK) in the reception-side communication device of the OBSS network, the data turns into an interference signal, and the reception-side communication device of the subject network cannot correctly receive the data (S13, S24). The same applies in a case where the data retransmitted from the transmission-side communication device of the OBSS network (retransmitted A-MPDU Data) overlaps with the timing of the block ACK frame (Block ACK) in the reception-side communication device of the subject network (S25, S14).

As described above, there is a problem in that a signal from the reception-side communication device of the subject network and a signal from the reception-side communication device of the OBSS network turn into interference signals for each other, and it takes time to finally send all the data. (Problems in an MLO)

Figure 4:
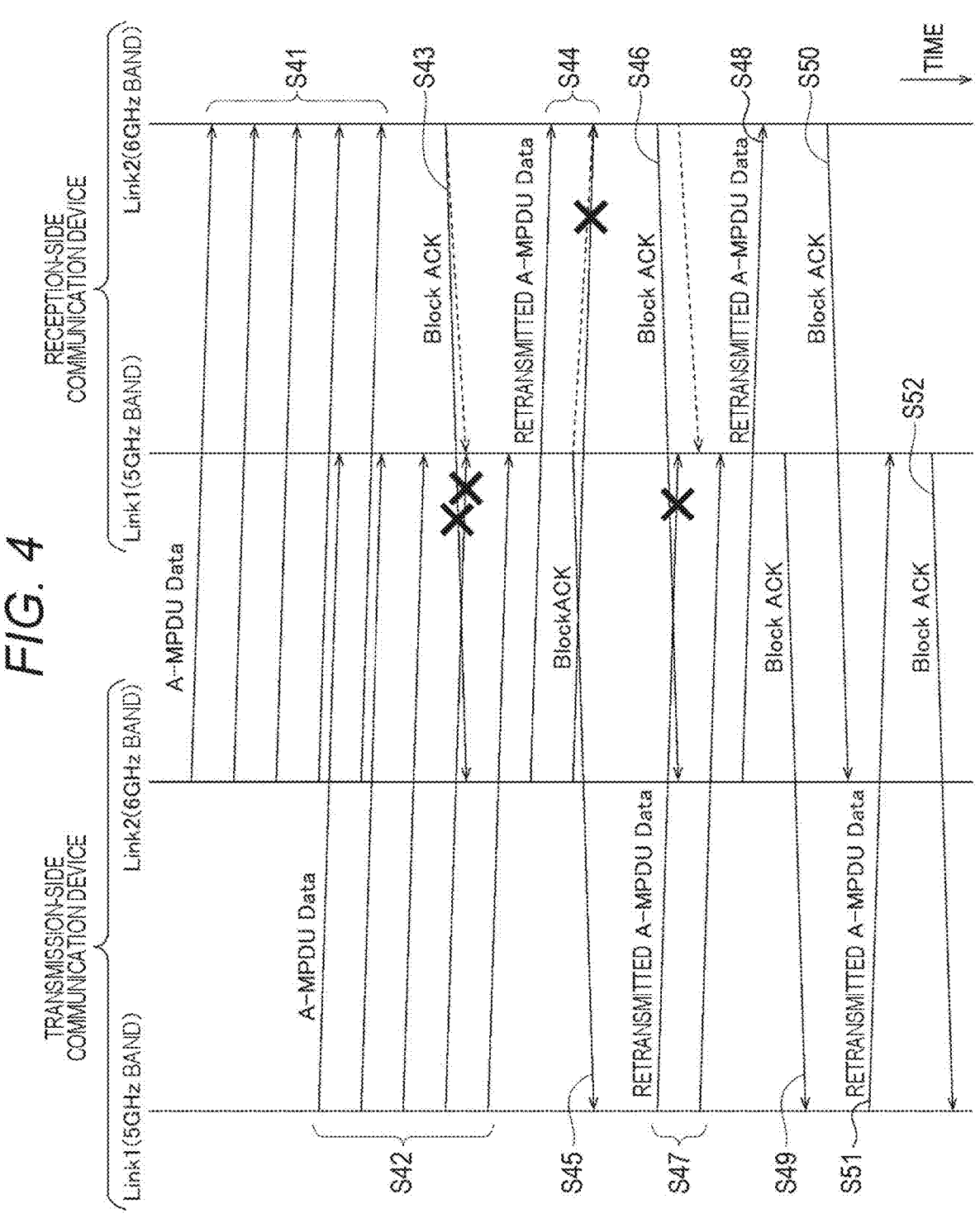
FIG. 4 is a sequence diagram illustrating a problem in a case where a multi-link operation using close frequency bands is performed.

FIG. 4 is a sequence diagram illustrating a problem in a case where a multi-link operation using close frequency bands is performed.

In FIG. 4, the left side in the drawing shows the transmission-side communication device that uses a 5 GHz band in a first link (Link 1) and a 6 GHz band in a second link (Link 2), and, likewise, the right side in the drawing shows the reception-side communication device that uses a 5 GHz band in the first link (Link 1) and a 6 GHz band in the second link (Link 2).

Here, in a case where a multi-link operation is performed, when both a 5 GHz band and a 6 GHz band are used, there is a possibility that the other data cannot be correctly received, due to a signal returned by one link.

That is, in a case where A-MPDU frames are transmitted asynchronously in the first link and the second link (S41, S42), and a multi-link operation is performed, when the communication using the second link comes to an end early, and a block ACK frame is returned (S43) immediately after that, there is a possibility that data reception of the A-MPDU frame in the first link will be interfered with by the signal.

Likewise, in a case where the communication in the first link has come to an end, if a block ACK frame is returned immediately after the end (S45), there is a possibility that the signal will interfere with the data reception of the A-MPDU frame retransmitted (S44) in the second link.

As described above, in a multi-link operation using close frequency bands, a block ACK frame transmitted by the reception-side communication device turns into an interference signal, and it takes time to finish transmitting all the data. (Data Transmission During an MLO According to the Present Technology)

Figure 5:
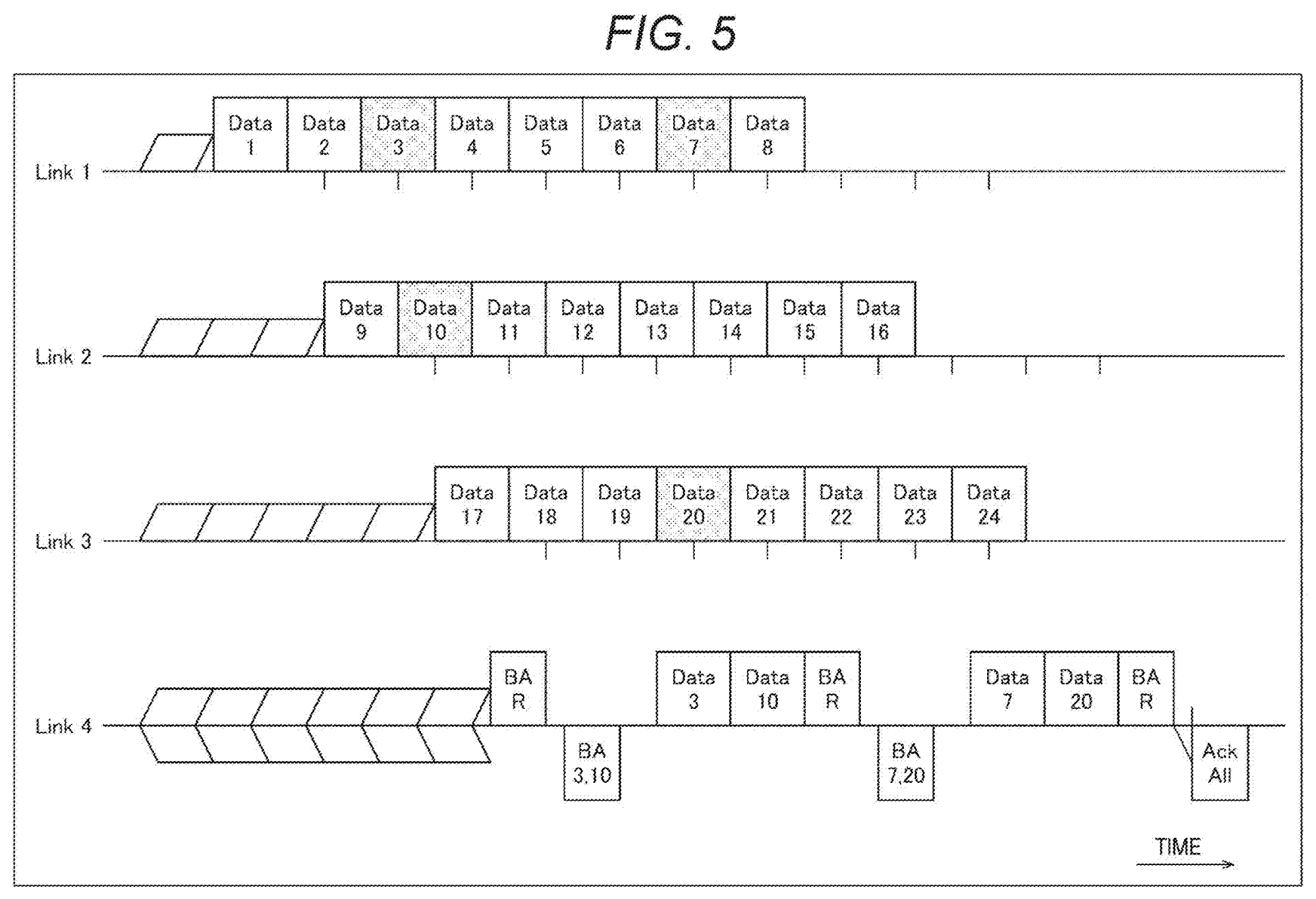

FIG. 5 is a diagram showing a flow of data transmission during a multi-link operation to which the present technology is applied. In FIG. 5, the direction of time is the direction from the left side toward the right side in the drawing.

FIG. 5 illustrates an example in which data transmission, requesting a block ACK, and ACK reception are performed with the four links of the first link (Link 1) to a fourth link (Link 4). This drawing illustrates a configuration in which requesting a block ACK and ACK reception are performed with the fourth link available at the latest timing among the four available links.

Squares in the drawing represent data, and sequence numbers are managed in each link with the numbers allocated to the respective pieces of "Data" shown in the respective squares, and an acknowledgment (ACK) of receipt is returned in the configuration. This example illustrates a configuration in which an A-MPDU frame is formed by aggregating eight MPDUs in each link, and data transmission is performed.

That is, in the first link (Link 1), when data with sequence numbers 1 to 8 acquires an access right under predetermined access control, frame aggregation is performed, and the data is transmitted as an A-MPDU frame. In the second link (Link 2), when data with sequence numbers 9 to 16 acquires an access right under predetermined access control, frame aggregation is performed, and the data is transmitted as an A-MPDU frame.

Also, in the third link (Link 3), when data with sequence numbers 17 to 24 acquires an access right under predetermined access control, frame aggregation is performed, and the data is transmitted as an A-MPDU frame. Further, in the fourth link (Link 4), which becomes available at last, a block ACK request (BAR) frame is immediately transmitted from the transmission-side communication device to the reception-side communication device.

Information that can identify the sequence numbers of the data transmitted so far may be added to this block ACK request frame. For example, information indicating a block ACK request regarding the data of Data 1 to Data 4 is included in the first link (Link 1), information indicating a block ACK request regarding the data of Data 9 and Data 10 is included in the second link (Link 2), and information indicating a block ACK request only regarding Data 17 is included in the third link (Link 3), with the decoding process delay time in the reception-side communication device being taken into consideration.

After that, on the basis of the block ACK request frame, the reception-side communication device responds with a block ACK frame to which ACK information for identifying the data received in the other links or the data yet to be delivered by the timing is added. FIG. 5 illustrates a situation in which the reception-side communication device has received Data 1 to Data 4 in the first link (Link 1) by the timing, and Data 3 among the received data is an error (a shaded square in the drawing).

Meanwhile, the second link (Link 2) is in a situation in which Data 9 to Data 11 have been received, and Data 10 among the received data is an error (a shaded square in the drawing). In the third link (Link 3), only Data 17 has been received.

The reception-side communication device that has received the data then writes and returns a block ACK (BA) frame that includes information regarding the sequence numbers of the data (MPDUs) that has been successfully collected or the data (MPDUs) that has not been successfully collected as errors. In this configuration, block ACK information indicating that Data 3 and Data 10 are the undelivered data is included in the information.

After that, the transmission-side communication device that has received the block ACK frame determines that Data 3 and Data 10 are undelivered, and transmit retransmission data (the undelivered data) at an early stage in the fourth link (Link 4), which is an unused link in the configuration. Further, the transmission-side communication device transmits a block ACK request frame even after transmission of the retransmission data, to request the reception-side communication device to report the reception status of the data (MPDUs) that has been received by that point of time in the configuration.

Information that can identify the sequence numbers of the data transmitted so far may be added to this block ACK request frame. For example, information indicating a block ACK request regarding the data of Data 1 to Data 8 is included in the first link (Link 1), information indicating a block ACK request regarding the data of Data 9 to Data 15 is included in the second link (Link 2), and information indicating a block ACK request regarding the data of Data 17 to Data 21 is included in the third link (Link 3), with the decoding process delay time in the reception-side communication device being taken into consideration.

After that, on the basis of the block ACK request frame, the reception-side communication device responds with a block ACK frame to which ACK information for identifying the data received in the other links or the data yet to be delivered by the timing is added. Also, a block ACK frame including the reception status of the retransmitted data (Data 3 and Data 10) is returned in the fourth link (Link 4) herein.

FIG. 5 illustrates a situation in which the reception-side communication device has an error in Data 7 (a shaded square in the drawing) in the first link (Link 1). Meanwhile, the second link (Link 2) is in a situation in there are no errors, and the third link (Link 3) is in a situation in which Data 20 is an error (a shaded square in the drawing).

Accordingly, the block ACK frame from the reception-side communication device includes block ACK information indicating that Data 7 and Data 20 are the undelivered data in the configuration.

After that, the transmission-side communication device that has received the block ACK frame determines that Data 7 and Data 20 are undelivered, and continues to transmit retransmission data in the fourth link (Link 4), which is an unused link in the configuration. Further, the transmission-side communication device transmits a block ACK request frame even after transmission of the retransmission data, to request the reception-side communication device to report the reception status of the data (MPDUs) that has been received by that point of time in the configuration.

Here, in a case where the reception-side communication device can correctly receive all the data in the configuration, the reception-side communication device returns a block ACK frame (Ack All) indicating that all the data has been received.

Note that FIG. 5 illustrates an example configuration in which, to prevent interference with an adjacent link, an ACK return may not be requested while an A-MPDU is being transmitted, and therefore, a block ACK frame is not returned after the A-MPDU. Further, in a case where the transmission-side communication device identifies the link in which a failure has occurred on the basis of the block ACK frame from the reception-side communication device (a case where continuous data such as Data 1 to Data 4 cannot be received in the first link, for example), the transmission-side communication device may suspend the transmission of the data frame using the link (the first link, for example).

Figure 6:
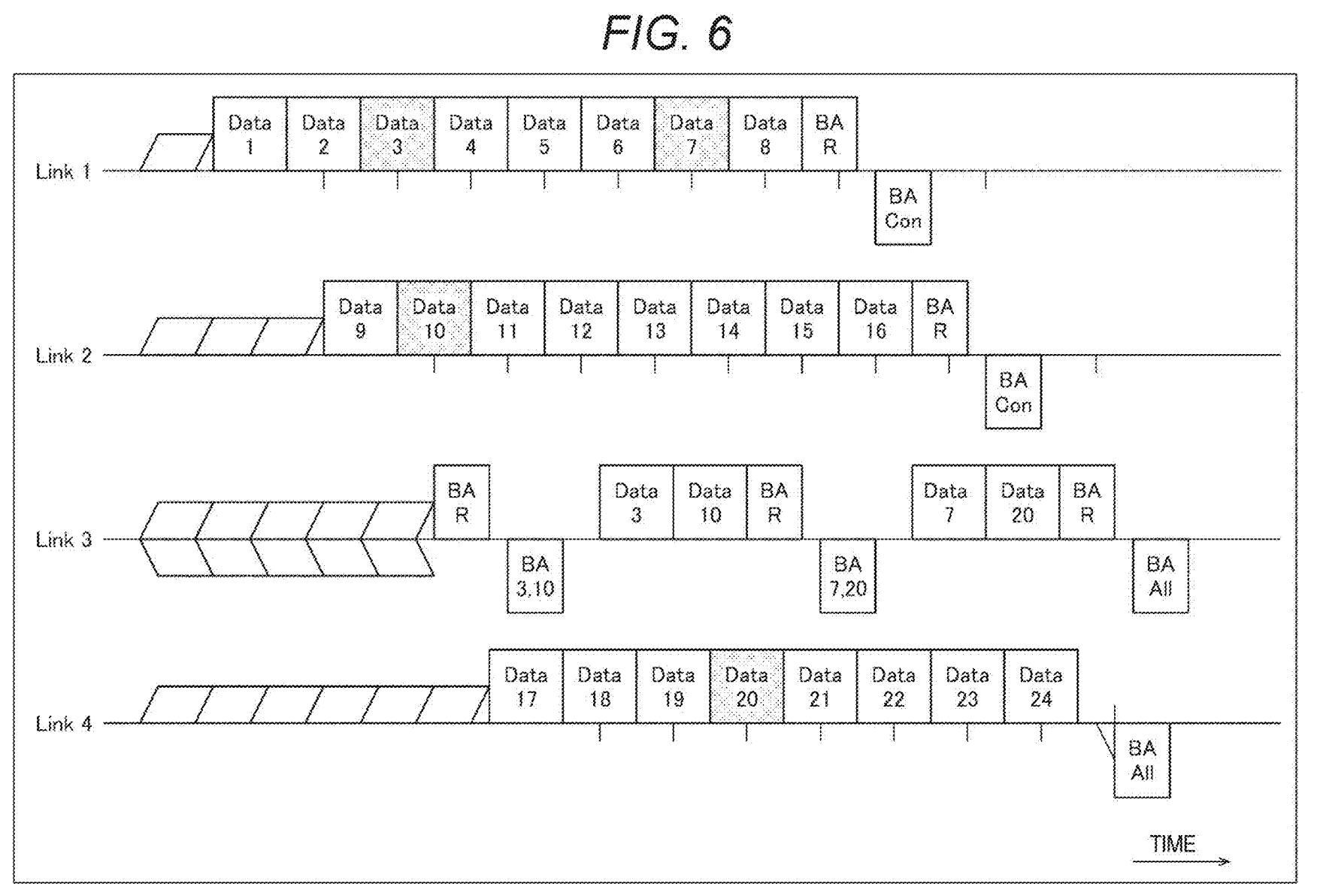

FIG. 6 is a diagram showing a first modification of the flow of data transmission during a multi-link operation to which the present technology is applied.

In comparison with FIG. 5 described above, FIG. 6 illustrates a configuration in which a block ACK request frame is not transmitted in an available link, but a block ACK request frame is transmitted in a link that becomes available after a predetermined number of pieces of data (MPDUs) constituting an A-MPDU are transmitted.

This drawing shows an example in which, immediately after the five pieces of data (MPDUs) of Data 1 to Data 3 in the first link (Link 1) and Data 9 and Data 10 in the second link (Link 2) are transmitted, a block ACK request frame is transmitted in the third link (Link 3) that has become available.

Note that the fourth link (Link 4) that becomes available after transmit data in the configuration. Also, the data configuration of the A-MPDU to be transmitted is transmitted as an A-MPDU configuration formed by aggregating eight MPDUs in each link, as in FIG. 5 described above. In FIG. 6, the contents of transmission in the third link (Link 3) and the contents of transmission in the fourth link (Link 4) are reversed from those in FIG. 5.

This drawing also illustrates an example configuration in which a block ACK request frame is transmitted so that a block ACK frame is returned after an A-MPDU, in a case where there is no need to prevent interference with an adjacent link. In this case, a block ACK frame from the reception-side communication device is returned in each link immediately after an A-MPDU transmitted from the transmission-side communication device in the configuration.

Further, a bit or a parameter indicating a block ACK request may be written in header information or delimiter information forming an A-MPDU frame, without explicit transmission of a block ACK request frame.

In the reception-side communication device that has received the block ACK request frame and the header information, information for identifying the sequence numbers of the data (MPDUs) that has been successfully decoded by that time may be written as the ACK information to be written in a block ACK frame.

That is, it should be noted that information about the MPDUs that have not been received in the other links is not correctly reflected in the block ACK frame returned in the first link (Link 1), and ACK information about all the data is written in the block ACK frame to be returned after transmission of all the data (MPDUs).

Figure 7:
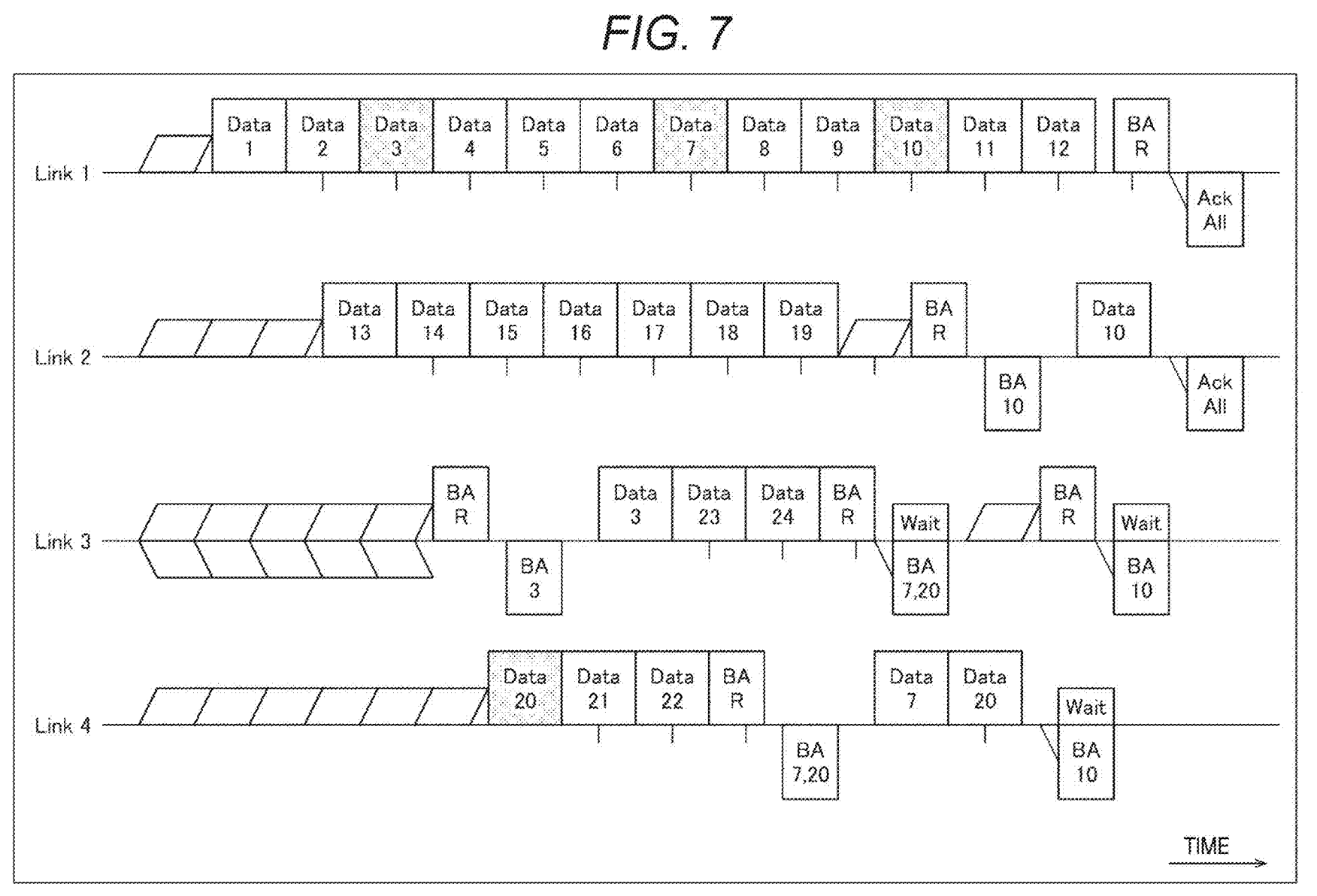

FIG. 7 is a diagram showing a second modification of the flow of data transmission during a multi-link operation to which the present technology is applied.

FIG. 7 illustrates an example in which the number of MPDUs to be aggregated in each link is not determined beforehand as in the configurations described above, but an A-MPDU is formed with the data stored in a buffer at a time when transmission becomes possible. Further, this drawing shows an example in which a block ACK request frame can be transmitted not in a specific link but in any desired link at necessary timing.

That is, in the first link (Link 1) that becomes available first, an A-MPDU frame is formed as the data stored in the buffer at that time, or data (Data 1 to Data 12) of the greatest possible length that can be formed as an A-MPDU frame. Also, in the second link (Link 2) that becomes available next, an A-MPDU frame is formed with the data (Data 13 to Data 19) stored in the buffer at that time.

After a predetermined number of pieces of data (MPDUs) are transmitted as in FIG. 6 described above, the first block ACK request frame is then transmitted in the third link (Link 3) that has become available herein.

At this timing in the reception-side communication device, Data 3 (a shaded square in the drawing) has not been delivered among Data 1 to Data 3 of the first link and Data 13 and Data 14 of the second link in the illustrated situation.

As a result, the reception-side communication device returns a block ACK frame including information for identifying Data 3 as undelivered data.

After that, in the fourth link (Link 4) that has become available, the transmission-side communication device may form an A-MPDU frame using the data (Data 20 to Data 22) stored in the buffer at that time, and add a block ACK request frame thereto after the formation of the A-MPDU frame, to obtain ACK information.

Further, in the illustrated configuration, transmission can be sequentially performed in the first link (Link 1), the second link (Link 2), and the fourth link (Link 4) so that a block ACK request frame can be transmitted in any link at any timing. That is, in the configuration illustrated in FIG. 7, a block ACK request frame is transmitted after transmission of an A-MPDU frame, and ACK information can be received in each link.

Note that, in a case where the transmission-side communication device has received a block ACK frame in the third link (Link 3), the transmission-side communication device may aggregate the data (Data 23 and Data 24) stored in the buffer at that time in addition to the data (Data 3) that needs to be retransmitted, to form an A-MPDU frame.

Further, in the fourth link (Link 4) in which a short A-MPDU frame is formed, a block ACK request frame is transmitted immediately after that, and the reception-side communication device returns a block ACK frame in which ACK information indicating that data (Data 7 and Data 20) has not been delivered among the data (MPDUs) received by that timing is written.

The transmission-side communication device that has received the block ACK frame retransmits the undelivered data (Data 7 and Data 20) in the fourth link (Link 4).

Also in the second link (Link 2) in the configuration, if the transmission channel is available on the basis of predetermined access control after the transmission of an A-MPDU, a block ACK request frame is transmitted at the time when a predetermined time has elapsed. That is, in a case where a predetermined time has elapsed after the block ACK request frame is transmitted in another link, the next block ACK request frame is transmitted in any desired link in the configuration.

In this configuration, a block ACK frame with which the data (Data 10) that has not been successfully collected in the reception-side communication device by that timing can be identified as undelivered data is returned. After that, the undelivered data (Data 10) is retransmitted in the second link (Link 2) in this configuration.

As described above, in the other links, it is possible to sequentially check undelivered data by transmitting a block ACK request frame at any desired timing in this configuration. Also in this case, in a case where the collection of all the data has been completed, a block ACK frame (Ack All) may be returned in any link in response to the block ACK request frame, or at any timing such as a time after the end of an A-MPDU or a time after transmission of the retransmission data.

Figure 8:
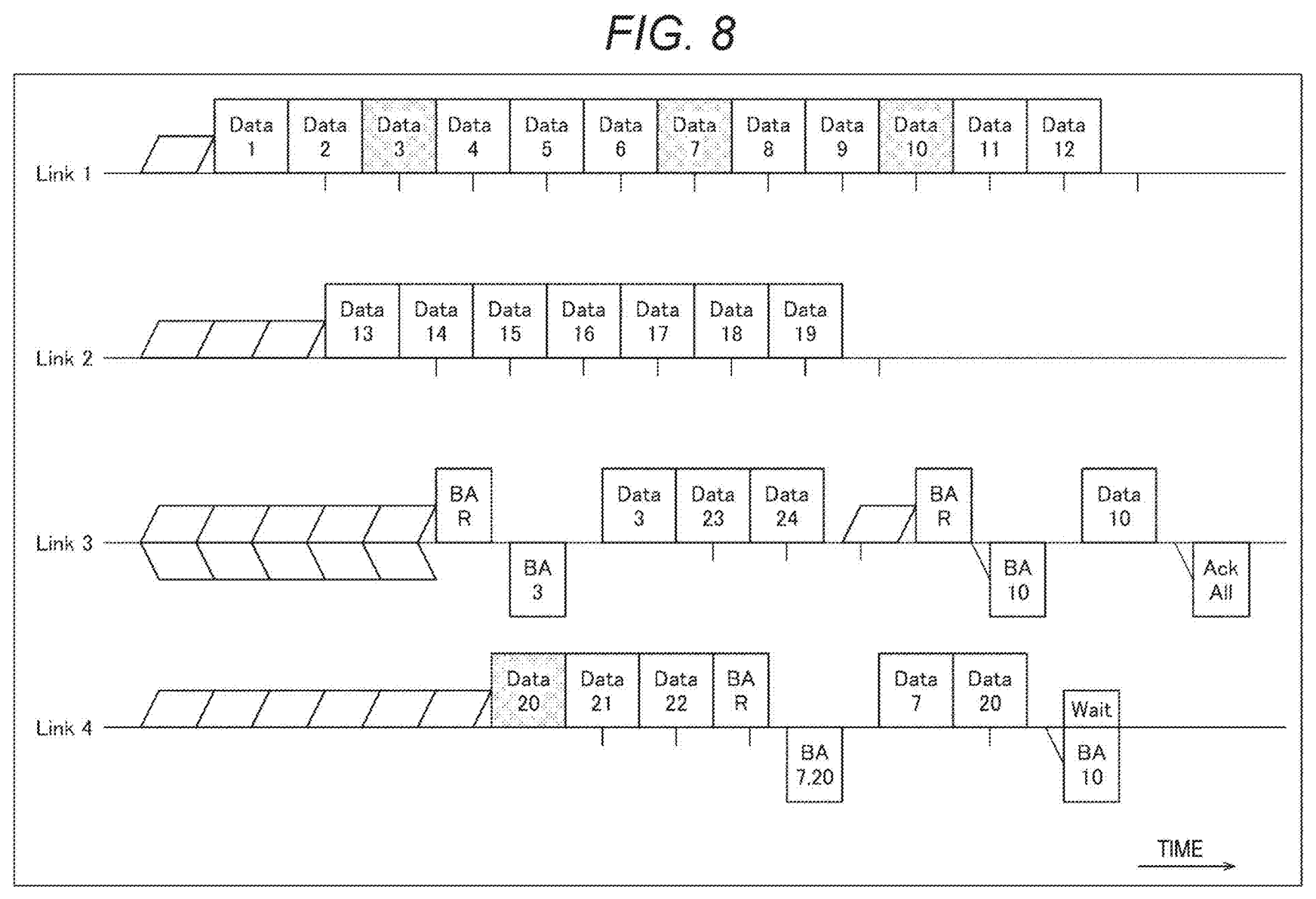

FIG. 8 is a diagram showing a third modification of the flow of data transmission during a multi-link operation to which the present technology is applied.

FIG. 8 illustrates an example case where a block ACK request frame is transmitted, and the links for receiving the block ACK frame are limited, though the configuration is basically similar to that in FIG. 7 described above.

That is, in a case where the frequency bands of two links are close to each other, if a block ACK frame is transmitted in another link while data is being received in one link, the data reception might be interfered with. Therefore, to reduce this influence, only data transmission is performed in these links that might cause interference, and a block ACK request frame and a block ACK frame are exchanged only in a link with less influence in this example.

Here, in the example illustrated in the drawing, in a case where the first link (Link 1) and the second link (Link 2) are in frequency bands subject to interferences, these links are used only for data transmission. The third link (Link 3) and the fourth link (Link 4) are formed in frequency bands that are subject to fewer interferences even when transmission and reception are performed at the same time. Therefore, the third link and the fourth link are set as the links to exchange a block ACK request frame and a block ACK frame.

Also in this configuration, a block ACK request frame and a block ACK frame are exchanged with the third link (Link 3) and the fourth link (Link 4), but a minimum block ACK request frame is transmitted after a predetermined time has elapsed since the time of transmission of the previous block ACK request frame so as to acquire ACK information at any desired timing.

Also in this case, in a case where the collection of all the data has been completed, a block ACK frame (Ack All) may be returned in any link in response to the block ACK request frame, or at any timing such as a time after the end of an A-MPDU or a time after transmission of the retransmission data.

Furthermore, an ACK Policy bit for requesting a return of a block ACK frame may be set in the header information or the delimiter information of an A-MPDU frame, without explicit transmission of a block ACK request frame.
(Sequence between Devices)

Figure 9:
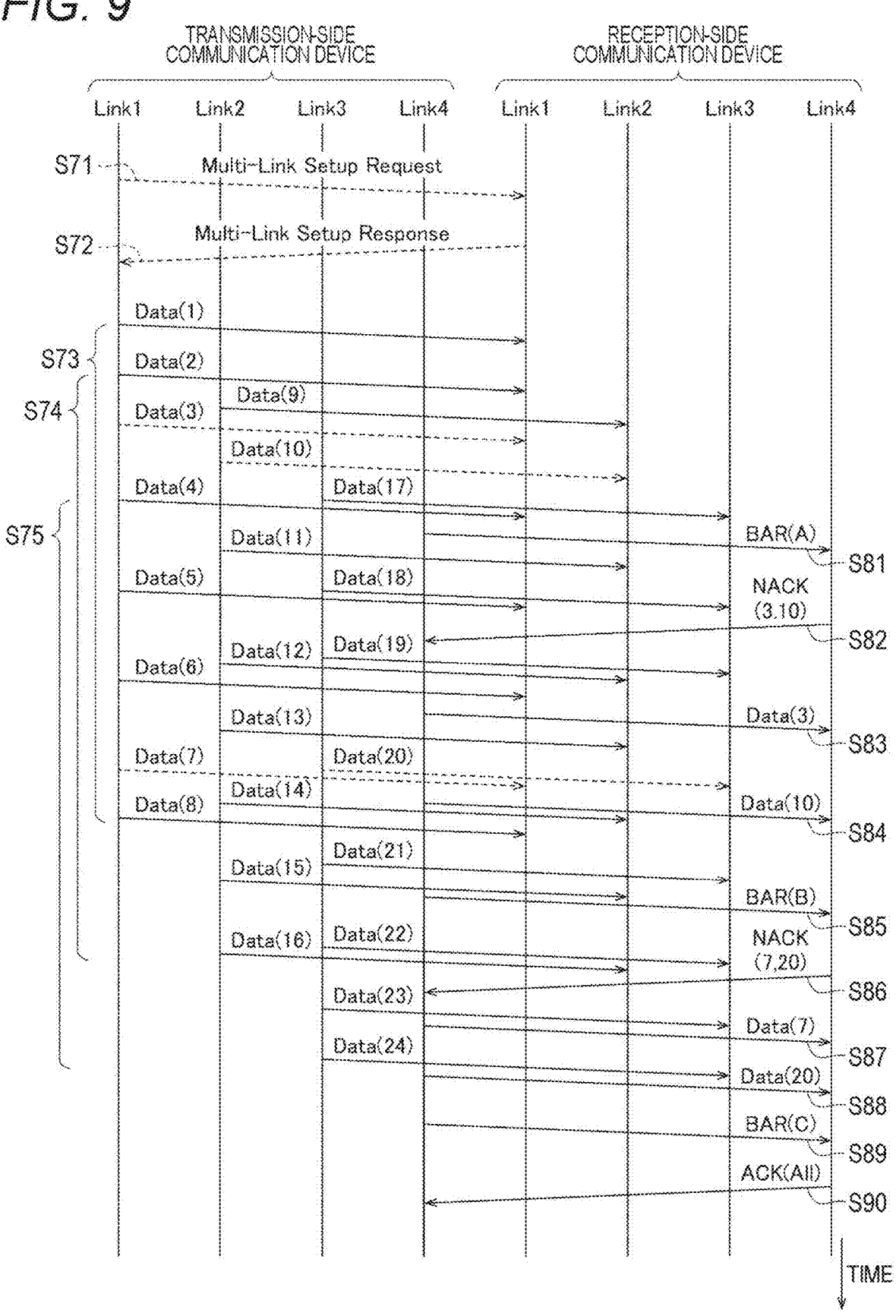
FIG. 9 is a diagram illustrating an example sequence between a transmission-side communication device and a reception-side communication device to which the present technology is applied.

FIG. 9 is a diagram illustrating an example sequence between a transmission-side communication device and a reception-side communication device to which the present technology is applied. In FIG. 9, the direction of time is the direction from the top side toward the bottom side in the drawing.

FIG. 9 illustrates a state in which a multi-link operation using a plurality of links is performed between a data transmission-side communication device on the left side and a reception-side communication device on the right side.

First, the transmission-side communication device and the reception-side communication device are designed to exchange parameter information such as a plurality of pieces of link information for performing a multi-link operation using a specific link (Link 1).

Specifically, in this configuration, the transmission-side communication device may transmit a multi-link setup request (Multi-Link Setup Request) (S71), and the reception-side communication device may return a multi-link setup response (Multi-Link Setup Response) (S72), for example, so that the parameters thereof are adjusted.

The parameters include link related information indicating that the second link (Link 2), the third link (Link 3), and the fourth link (Link 4), in addition to the first link (Link 1), are links capable of transmitting data and a block ACK request frame, and returning a block ACK frame.

FIG. 9 illustrates a sequence of data transmission during the multi-link operation illustrated in FIG. 5 described above, and specifically illustrates an example in which the data of an A-MPDU is transmitted in the first link (Link 1) to the third link (Link 3) (S73 to S75), and a block ACK request (BAR) frame and a block ACK (BA) frame are exchanged in the fourth link (Link 4) (S81 to S90).

The first link (Link 1) shows a state in which reception of Data 3 with the sequence number 3 among Data 1 to Data 4, which are the data transmitted as an A-MPDU frame, is an error. The second link (Link 2) shows a state in which reception of Data 10 with the sequence number 10 between Data 9 and Data 10, which are the data transmitted as an A-MPDU frame, is an error. The third link (Link 3) shows a state in which Data 17, which is the data transmitted as an A-MPDU frame, is transmitted.

Further, in a case where the fourth link (Link 4) becomes available herein, the transmission-side communication device transmits a block ACK request frame in that link (S81) in the configuration. Here, the reception-side communication device that has received the block ACK request frame returns a block ACK frame including information for identifying Data 3 and Data 10 among the data (MPDUs) that has not been delivered so far in the fourth link (Link 4) (S82).

Further, the transmission-side communication device retransmits Data 3 and Data 10, which are the undelivered data herein, using the fourth link (Link 4) (S83, S84), and after that, a block ACK request frame is also transmitted (S85).

Further, the first link (Link 1) shows a state in which reception of Data 7 with the sequence number 7 among Data 1 to Data 8, which are the data transmitted as an A-MPDU frame, is an error. The second link (Link 2) shows a state in which Data 9 to Data 15, which are the data transmitted as an A-MPDU frame, are transmitted. The third link (Link 3) shows a state in which reception of Data 20 with the sequence number 20 among Data 17 to Data 21, which are the data transmitted as an A-MPDU frame, is an error.

Further, in a case where the fourth link (Link 4) becomes available herein, the transmission-side communication device transmits a block ACK request frame in that link (S85) in the configuration. Here, the reception-side communication device that has received the block ACK request frame returns a block ACK frame including information for identifying Data 7 and Data 20 among the data (MPDUs) that has not been delivered so far in the fourth link (Link 4) (S86).

Further, the transmission-side communication device retransmits Data 7 and Data 20, which are the undelivered data herein, using the fourth link (Link 4) (S87, S88), and after that, a block ACK request frame is also transmitted (S89). A block ACK frame (Ack All) indicating that all the data has been received is then returned from the reception-side communication device (S90), and the series of sequence processes then comes to an end in the configuration.
(Configuration of a Communication Device)

Figure 10:
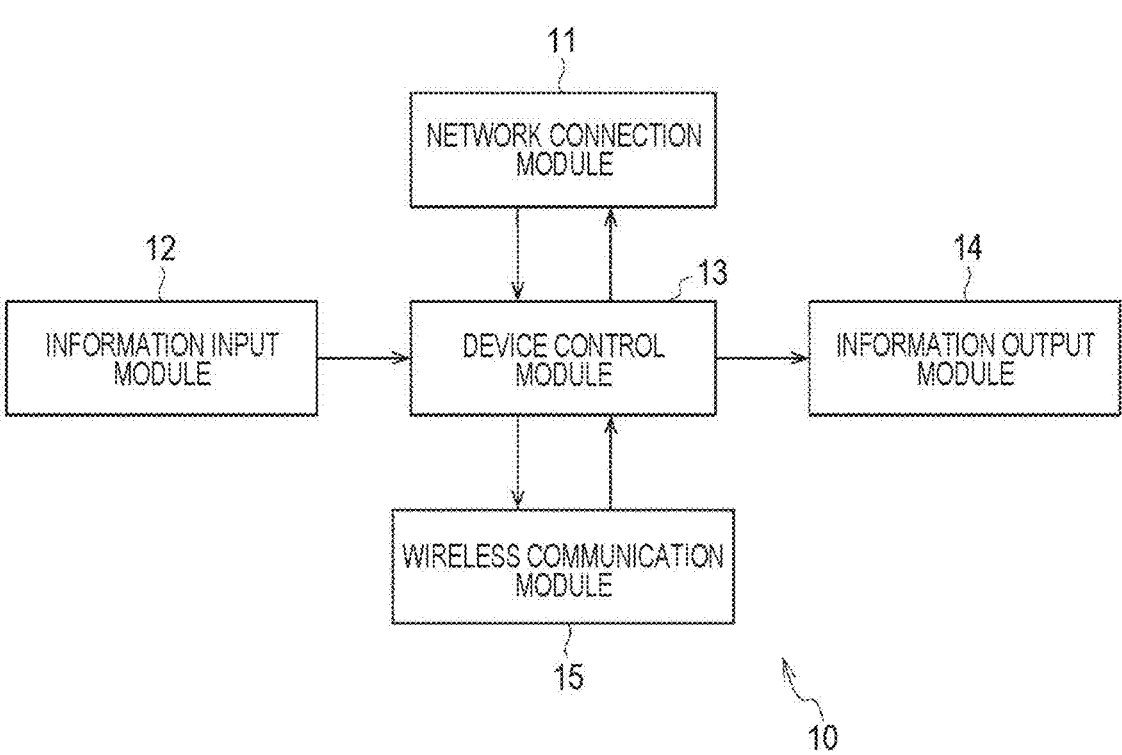
FIG. 10 is a block diagram showing an example configuration of a communication device to which the present technology is applied.

FIG. 10 is a block diagram showing an example configuration of a communication device to which the present technology is applied.

A communication device 10 shown in FIG. 10 is a wireless communication device designed as the access point AP10 or a communication terminal STA10 in the wireless LAN system 1-1 (FIG. 1), or designed as the transmission-side communication device 10Tx or the reception-side communication device 10Rx.

In FIG. 10, the communication device 10 includes a network connection module 11, an information input module 12, a device control module 13, an information output module 14, and a wireless communication module 15.

The network connection module 11 includes a circuit as the access point AP10 having a function of connecting an optical fiber network or some other communication line to the Internet network via a service provider, a peripheral circuit of the circuit, a microcontroller, a semiconductor memory, and the like, for example.

The network connection module 11 performs various kinds of processes related to the Internet connection, under control of the device control module 13. For example, in a case where the communication device 10 operates as the access point AP10, the network connection module 11 has a configuration in which the functions of a communication modem or the like for connecting to the Internet network are installed, and conducts the Internet connection via a public communication line and an Internet service provider.

The information input module 12 is formed with an input device such as push buttons, a keyboard, or a touch panel, for example. The information input module 12 has a function of inputting instruction information corresponding to an instruction from a user, to the device control module 13.

The device control module 13 includes a microprocessor, a microcontroller, a semiconductor memory, and the like, for example. The device control module 13 controls the respective components (modules) to cause the communication device 10 to operate as the access point AP10 or a communication terminal STA10.

The device control module 13 performs various kinds of processes on information supplied from the network connection module 11, the information input module 12, or the wireless communication module 15. The device control module 13 also supplies information obtained as a result of processing performed by itself, to the network connection module 11, the information output module 14, or the wireless communication module 15.

For example, at a time of data transmission, the device control module 13 supplies transmission data passed from an application or the like of a protocol upper layer, to the wireless communication module 15. Also, at a time of data reception, the device control module 13 passes reception data supplied from the wireless communication module 15 on to an application or the like of a protocol upper layer.

The information output module 14 is formed with an output device that includes a display element such as a liquid crystal display, an organic EL display, or a light emitting diode (LED) display, and a speaker that outputs voice or music, for example.

The information output module 14 has a function of displaying information necessary to the user, on the basis of the information supplied from the device control module 13. Here, the information to be processed by the information output module 14 includes an operating state of the communication device 10, and information obtained via the Internet network, for example.

The wireless communication module 15 is formed with a wireless chip, a peripheral circuit, a microcontroller, a semiconductor memory, and the like, for example. The wireless communication module 15 performs various kinds of processes related to wireless communication, under the control of the device control module 13. The configuration of the wireless communication module 15 will be described later in detail, with reference to FIG. 11.

Note that, although a wireless communication module on which a wireless communication chip, peripheral circuits, and the like are mounted is described as an example herein, the present technology can be applied not only to a wireless communication module, but also to a wireless communication chip, a wireless communication LSI, and the like, for example. Further, whether to include an antenna is optional in the wireless communication module.

Also, in the communication device 10 shown in FIG. 10, the device control module 13 and the wireless communication module 15 are essential components, but whether to include the other modules, which are the network connection module 11, the information input module 12, and the information output module 14, as components is optional.

That is, each individual communication device 10 operating as the access point AP10 or a communication terminal STA10 can be formed only with necessary modules, and unnecessary portions can be simplified or excluded.

More specifically, the network connection module 11 can be incorporated only in the access point AP10, and the information input module 12 and the information output module 14 can be incorporated only in the communication terminal STA10, for example.

Figure 11:
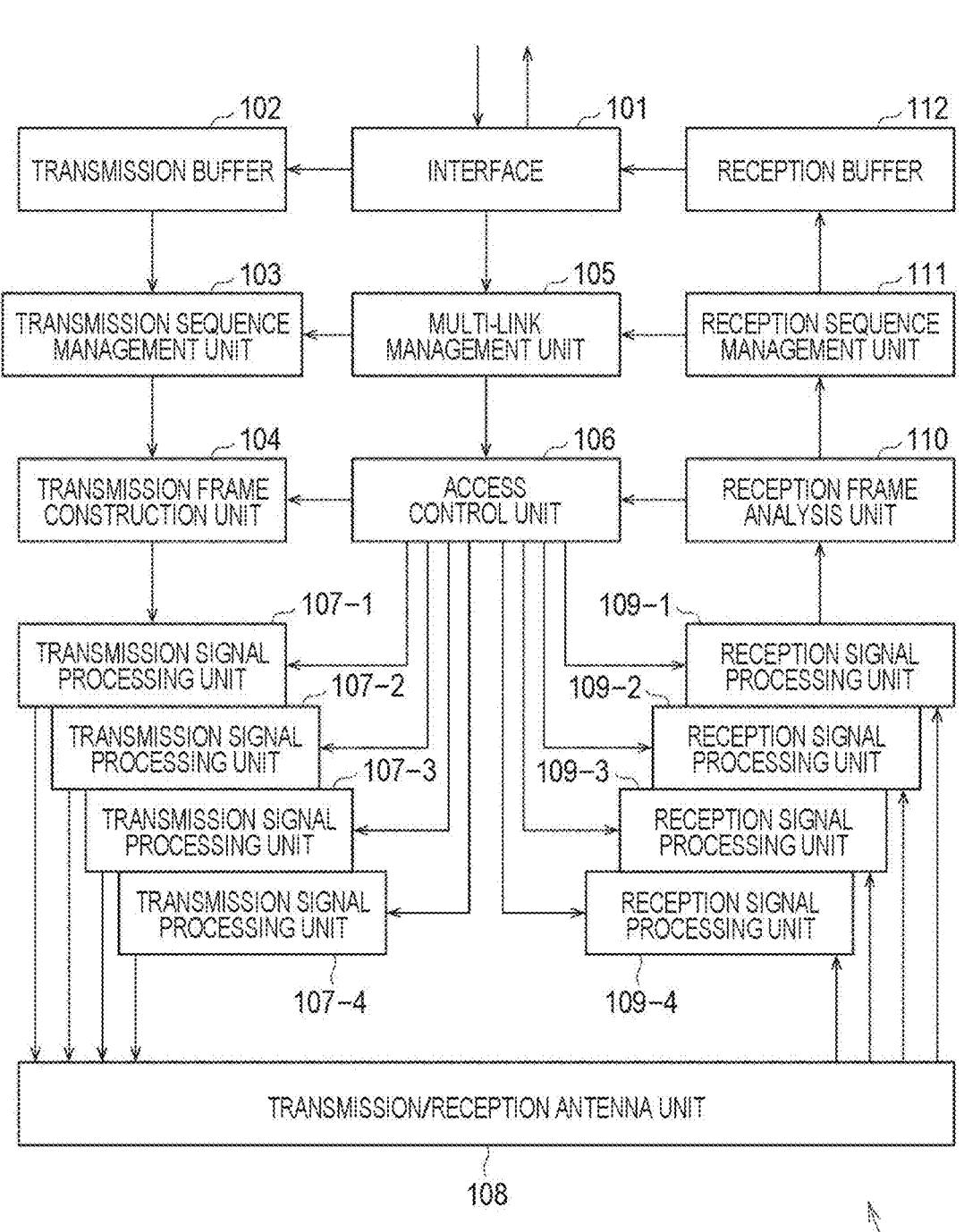
FIG. 11 is a block diagram showing an example configuration of the wireless communication module shown in FIG. 10.

FIG. 11 is a block diagram showing an example configuration of the wireless communication module 15 shown in FIG. 10.

The wireless communication module 15 has a configuration that includes an interface 101 that is connected to another module and exchanges various kinds of information and data, and a transmission buffer 102 that stores the data to be transmitted. This configuration further includes a transmission sequence management unit 103, a transmission frame construction unit 104, a multi-link management unit 105, and an access control unit 106.

The transmission sequence management unit 103 manages the sequence numbers allocated to the data to be transmitted. The transmission frame construction unit 104 constructs a transmission frame by constructing an A-MPDU frame using the data to be transmitted as an aggregate, constructing a block ACK frame of receipt acknowledgment (ACK) information, or the like.

The multi-link management unit 105 transmits a block ACK request frame to a plurality of data transmission links to which the present technology is applied, and manages setting of the links to receive the block ACK frame and an operation in the multiple links. The access control unit 106 checks the setting of a predetermined back-off time and the usage status of the transmission channel in each link.

Further, transmission signal processing units 107 of the respective links that construct transmission signals in the respective links and perform predetermined signal processing are prepared including the number of the multiple links. FIG. 11 illustrates a case where the four links of the first link (Link 1) to the fourth link (Link 4) are available, and the transmission signal processing units are formed with transmission signal processing units 107-1 to 107-4.

Note that each transmission signal processing unit 107 is designed to sequentially determine an available link, under the control of the access control unit 106 in accordance with signal detection statuses obtained from reception signal processing units 109 described later.

In this configuration, the operation is performed to select whether to transmit a link for transmitting an A-MPDU frame of data or a block ACK request frame as necessary, on the basis of a predetermined condition. For example, after transmission of a predetermined number of MPDUs in an A-MPDU, a block ACK request frame may be transmitted in the link that has become available. Alternatively, after a predetermined time has elapsed since the timing of transmission of the first A-MPDU, a block ACK request frame may be transmitted in the link that has become available. The reception-side communication device 10Rx then receives a return of ACK information for identifying the MPDUs that have been collected or the MPDU that has had an error by that timing in the configuration.

Transmission signals from the transmission signal processing units 107-1 to 107-4 are wirelessly transmitted via a transmission/reception antenna unit 108, or reception signals are acquired via the transmission/reception antenna unit 108.

The received signals are then prepared including the number of multiple links by the reception signal processing units 109 that perform a process of decoding the received signals in the respective links. FIG. 11 illustrates a case where the four links of the first link (Link 1) to the fourth link (Link 4) are available, and the reception signal processing units are formed with reception signal processing units 109-1 to 109-4.

This configuration further includes a reception frame analysis unit 110, a reception sequence management unit 111, and a reception buffer 112.

The reception frame analysis unit 110 analyzes an A-MPDU frame from received signals, and determines whether or not each piece of the MPDU data has been extracted and correctly received. The reception sequence management unit 111 manages the sequence numbers allocated to the received MPDU data. The reception buffer 112 temporarily stores the received data.

Note that, in a case where the communication device is the reception-side communication device 10Rx, the wireless communication module 15 is designed to be capable of promptly receiving a block ACK request frame in a link in which data is not received. That is, in a case where the block ACK request frame is received, the wireless communication module 15 identifies the data received so far in the other links, and identifies the sequence numbers of the MPDUs that have been received or has become an error in the configuration.

Also in a case where the communication device 10 is the reception-side communication device 10Rx, the wireless communication module 15 is designed to construct a block ACK frame from acknowledgment (ACK) information or negative acknowledgment (NACK) information about the received data, and return the block ACK frame as control information via the multi-link management unit 105. These block ACK frames may be constructed both in a case where the construction is performed after a block ACK request frame is received from the transmission-side communication device 10Tx, and in a case where the construction is performed immediately after an A-MPDU frame is received.

Note that, in the configuration shown in FIG. 11, arrows between the respective blocks indicate flows and control of data (signals), and each block operates in cooperation with other blocks connected thereto by the arrows, to achieve its functions.

That is, the multi-link management unit 105 operates in cooperation with each of the interface 101, the transmission sequence management unit 103, the access control unit 106, and the reception sequence management unit 111, to achieve a function related to multi-link operation management as a function characteristic of the present technology, for example.

Also, the access control unit 106 operates in cooperation with each of the transmission frame construction unit 104, the multi-link management unit 105, the transmission signal processing units 107-1 to 107-4, the reception signal processing units 109-1 to 109-4, and the reception frame analysis unit 110, to achieve a function related to data transmission and reception control as a function characteristic of the present technology, for example.

In the wireless communication module 15 designed as above, in particular, the multi-link management unit 105, the access control unit 106, the transmission signal processing units 107-1 to 107-4, the reception signal processing units 109-1 to 109-4, and the like function as a control unit that controls operations of the respective components, to perform processes as described below, for example.

That is, in the wireless communication module 15 of a communication device 10 (the transmission-side communication device 10Tx, for example), the control unit exchanges frames (various kinds of frames, for example) with another communication device (the reception-side communication device 10Rx, for example) by wireless communication using a plurality of links (the first link to the fourth link in FIG. 5, for example). When a data frame (an A-MPDU frame, for example) including aggregated data is transmitted with the use of a first link (the first link, the second link, or the third link in FIG. 5, for example), a data acknowledgment request frame (a block ACK request (BAR) frame, for example) is transmitted with the use of a second link (the fourth link in FIG. 5, for example), and an acknowledgment frame (a block ACK (BA) frame, for example) corresponding to the acknowledgment request frame is received from the other communication device (the reception-side communication device 10Rx, for example) that has received the data frame.

At this stage, the acknowledgment request frame can be transmitted after a predetermined time has elapsed since the start of the transmission of the data frame and before the end of the transmission of the data frame. Alternatively, the acknowledgment request frame may be transmitted after a predetermined amount of data among the data included in the data frame is transmitted.

In a case where the communication device 10 (the transmission-side communication device 10Tx, for example) identifies the data (undelivered data) that needs to be retransmitted to the other communication device (the reception-side communication device 10Rx, for example) on the basis of the received acknowledgment frame (a block ACK frame, for example), the specified data (undelivered data) can be transmitted before the transmission of the data frame ends. Also, in a case where the communication device 10 (the transmission-side communication device 10Tx, for example) identifies the data (undelivered data) that needs to be retransmitted to the other communication device (the reception-side communication device 10Rx, for example) on the basis of the received acknowledgment frame (a block ACK frame, for example), the specified data (undelivered data) can be transmitted with the use of any desired link.

Note that, in a case where the communication device (the transmission-side communication device 10Tx, for example) identifies the link in which a failure has occurred on the basis of the received acknowledgment frame (a block ACK frame, for example) (a case where continuous data such as Data 1 to Data 4 cannot be received in the first link in FIG. 5, for example), the transmission of the data frame using the link (the first link in FIG. 5, for example) may be suspended.

On the other hand, in the wireless communication module 15 of a communication device 10 (the reception-side communication device 10Rx, for example), the control unit exchanges frames (various kinds of frames, for example) with another communication device (the transmission-side communication device 10Tx, for example) by wireless communication using a plurality of links (the first link to the fourth link in FIG. 5, for example). When a data frame (an A-MPDU frame, for example) including aggregated data is received from the other communication device (the transmission-side communication device 10Tx, for example) using a first link (the first link, the second link, or the third link in FIG. 5, for example), a data acknowledgment request frame (a block ACK request (BAR) frame, for example) is received with the use of a second link (the fourth link in FIG. 5, for example), and, on the basis of the received acknowledgment request frame, an acknowledgment frame (a block ACK (BA) frame, for example) including an acknowledgment of the collected data (MPDUs, for example) is generated and is transmitted to the other communication device (the transmission-side communication device 10Tx, for example) that transmitted the data frame.

At this stage, the acknowledgment frame is generated on the basis of the parameter included in the acknowledgment request frame. For example, the acknowledgment frame can be generated on the basis of identification information that is included in the acknowledgment request frame and is designed to be used for identifying the sequence numbers that do not require any acknowledgment of receipt. Note that data (received data) received by that point of time may be discarded on the basis of identification information that is included in the acknowledgment request frame and is designed to be used for identifying the sequence numbers that do not require any acknowledgment of receipt.

When receiving a data frame (an A-MPDU frame, for example) transmitted from the other communication device (the transmission-side communication device 10Tx, for example), the communication device 10 (the reception-side communication device 10Rx, for example) can receive the data (undelivered data) that needs to be retransmitted with the use of any desired link, before the reception of the data frame comes to an end.

(Configuration of a BAR)

FIG. 12 is a diagram showing an example configuration of a block ACK request (BAR) frame to which the present technology is applied.

The block ACK request frame has a configuration that includes, in a predetermined MAC header portion, Frame Control indicating the type of the frame, Duration indicating the duration of the frame, Receive Address for identifying the reception-side communication device 10Rx, and Transmit Address for identifying the transmission-side communication device 10Tx.

In this configuration, BAR Control is included as a parameter of the block ACK request frame. BAR Control includes a BAR Type field. FIG. 13 is a diagram showing an example of BAR Type. As shown in FIG. 13, in the BAR Type field, an M-BAR parameter for identifying a block ACK request during a multi-link operation can be designated as a numerical value of "11".

As BAR information, the configuration includes, in addition to a Starting Sequence Number field, Multi-Links Information in which parameters of the multi-link operation are written, a Block ACK Bitmap Length that designates the bitmap length of the responding block ACK frame, Discard Sequence Number (S/N) as information for identifying an unused Sequence number space, and the like. A frame check sequence (FCS) is added to the end of the frame in the configuration.

That is, the block ACK request frame can include, in the parameters, identification information for identifying the data that requires an acknowledgment of receipt from the reception-side communication device 10Rx. For example, the identification information can include information for identifying the sequence numbers that do not require an acknowledgment of receipt, and information regarding the amount of the data that needs to be retransmitted (the data yet to be delivered).

Note that the block ACK request frame to which the present technology is applied can be formed with a block ACK request frame according to the current method, but FIG. 12 illustrates a configuration in which necessary parameters are added so as to clearly show the features of the present technology. Also, in the block ACK request frame shown in FIG. 12, a field of Request BA Type may be added to Reserved in BAR Control, to allow a BA Type request.

(Configuration of an A-MPDU)

Figure 14:
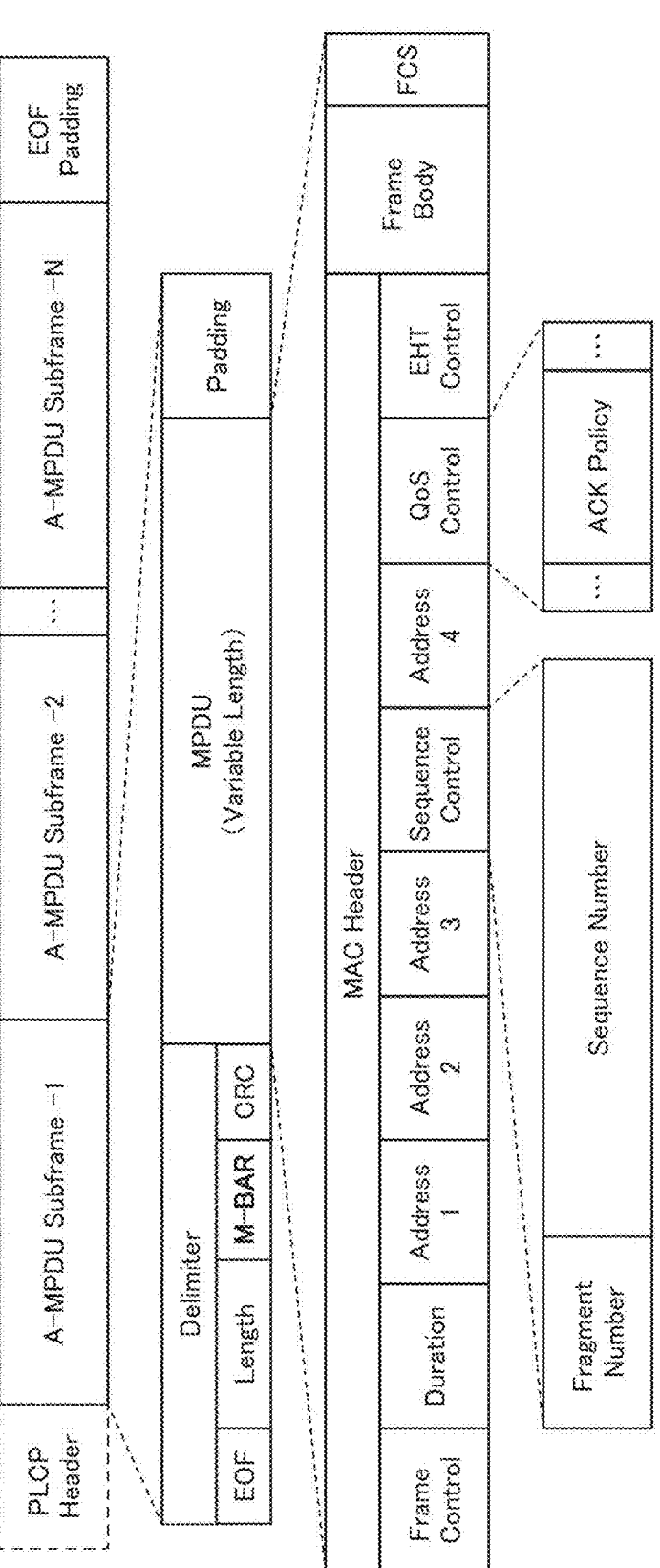
FIG. 14 is a diagram showing an example configuration of an A-MPDU frame to which the present technology is applied.

FIG. 14 is a diagram showing an example configuration of an A-MPDU frame to which the present technology is applied.

The configuration of an A-MPDU frame includes MPDUs corresponding to the number of frames to be aggregated. Accordingly, the example illustrated herein is an example in which an A-MPDU as a frame includes N subframes from A-MPDU Subframe-1 to A-MPDU Subframe-N. Further, these subframes each have a configuration that includes a delimiter (Delimiter) indicating a boundary of the subframe and an MPDU, and has a padding (Padding) added thereto as necessary or has EOF Pad added only to the end of the A-MPDU.

The delimiter includes Length information indicating the information length of the MPDU. Also, the example illustrated herein is an example in which a bit for identifying a block ACK request (BAR) is prepared with the delimiter portion of the A-MPDU frame so as to substitute for a block ACK request (BAR) in a multi-link operation.

That is, by identifying a specific bit in the delimiter portion in the A-MPDU frame configuration according to the current method as a block ACK request (BAR) during a multi-link operation, a prompt return of a block ACK frame may be requested after the end of the A-MPDU, without transmission of the block ACK request frame described above. That is, information indicating the block ACK request (BAR) included in the block ACK request frame can be included in any data and be transmitted.

In each MPDU, a predetermined MAC header (MAC Header) is added to the frame body (Frame Body), and a frame check sequence (FCS) is further added thereto. The MAC header includes Frame Control, Duration, Address 1, Address 2, Address 3, Sequence Control, Address 4, QoS Control, and EHT Control.

In Frame Control, information regarding the format of the frame is written. In Duration, the duration of the frame is written. In Address 1 to Address 4, address information for identifying the transmission source and reception destination devices and the like is written. In Sequence Control, sequence number of the MPDU is written. In QoS Control, parameters of quality of service (QoS) control are written. In EHT Control, parameters for enhanced high throughput (EHT) control are written.

(Configuration of a BA)

Figure 15:
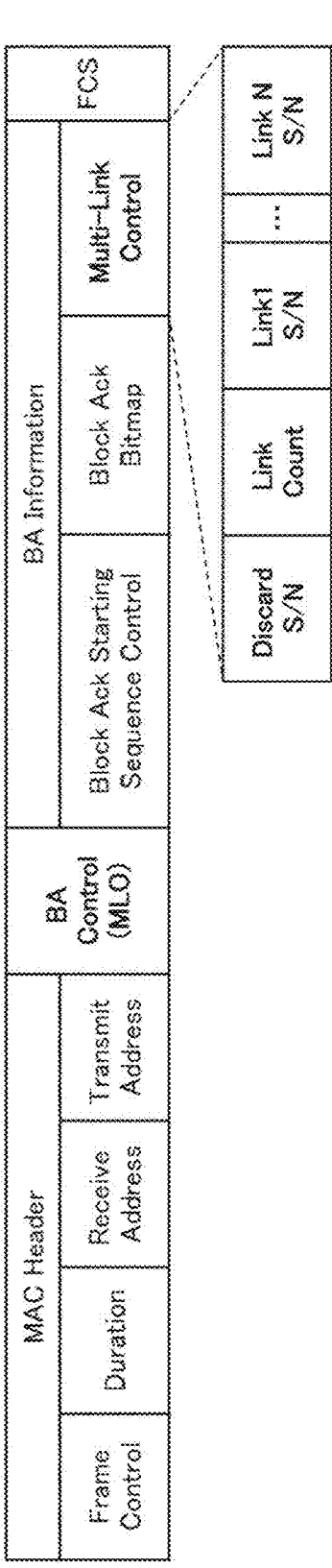
FIG. 15 is a diagram showing an example configuration of a block ACK frame to which the present technology is applied.

FIG. 15 is a diagram showing an example configuration of a block ACK (BA) frame to which the present technology is applied. FIG. 15 illustrates an example configuration of a block ACK frame with a multi-link operation taken into consideration.

In FIG. 15, the block ACK frame has a configuration that includes, in a predetermined MAC header portion, Frame Control indicating the type of the frame, Duration indicating the duration of the frame, Receive Address for identifying the reception-side communication device 10Rx, and Transmit Address for identifying the transmission-side communication device 10Tx.

In this configuration, BA Control is included as a parameter of the block ACK frame. In BA Control, an MLO parameter for identifying a block ACK during a multi-link operation can be designated in a BA Type field.

As BA Information, Multi-Link Control, which is a parameter related to a multi-link operation to which the present technology is applied, is added in addition to the fields of Block Ack Sequence Control and Block ACK Bitmap.

Multi-Link Control has a configuration in which Discard Sequence Number (S/N), Link Count indicating the number of links in the multi-link operation, the latest sequence numbers (Link 1 S/N to Link N S/N) in the respective links, and the like are written as information for identifying the Sequence number space that is not used, so that undelivered data can be identified. A frame check sequence (FCS) is added to the end of the frame in the configuration.

Note that the block ACK frame to which the present technology is applied can be formed with a block ACK frame according to the current method, but FIG. 15 illustrates a configuration in which necessary parameters are added so as to clearly show the features of the present technology.

FIG. 16 is a diagram showing a first modification of the configuration of a block ACK frame with a multi-link operation taken into consideration. FIG. 16 illustrates an example configuration of a block ACK frame in which NACK information is written to identify undelivered data.

In FIG. 16, in the block ACK frame, BA Control is included as a parameter of the block ACK frame in addition to a predetermined MAC header portion, and a NACK parameter for identifying that NACK information written herein can be designated in a BA Type field herein.

Information for identifying NACK information is written as BA Information, and BA Information includes Discard Sequence Number (S/N) as information for identifying a Sequence number space that is not used, NACK Starting Sequence Control indicating the smallest sequence number in the NACK information, NACK Bitmap for identifying Sequence Number leading to NACK in a predetermined bitmap format starting from the sequence number, and the like. A frame check sequence (FCS) is added to the end of the frame in the configuration.

FIG. 17 is a diagram showing a second modification of the configuration of a block ACK frame with a multi-link operation taken into consideration. FIG. 17 illustrates an example configuration of a block ACK frame in which NACK information is written to identify undelivered data.

In FIG. 17, in the block ACK frame, BA Control is included as a parameter of the block ACK frame in addition to a predetermined MAC header portion, and a NACK parameter for identifying that NACK information written herein can be designated in a BA Type field herein.

Information for identifying NACK information is written as BA Information, and BA Information includes Discard Sequence Number (S/N) as information for identifying a Sequence number space that is not used, NACK Counts as the NACK information indicating the number of pieces of undelivered data, and NACK Sequence Number for designating Sequence Number of NACK corresponding to the number of pieces of undelivered data. A frame check sequence (FCS) is added to the end of the frame in the configuration.

(Configuration of a Setup Frame)

FIG. 18 is a diagram showing an example configuration of a frame in which a multi-link operation is replaced with a setup.

The configuration of the frame illustrated in FIG. 18 indicates information that is transmitted as a multi-link setup request (Multi-Link Setup Request) from the transmission-side communication device 10Tx, and is returned as a multi-link setup response (Multi-Link Setup Response) from the reception-side communication device 10Rx, for example.

The configuration of the frame in which the parameters are exchanged includes, as a predetermined MAC header, Frame Control indicating the frame type, Duration indicating the duration of the frame, Transmit Address indicating the transmission source address, and Receive Address indicating the reception-side address.

Further, the configuration includes, as the parameters constituting multi-link information elements (Multi-Link Information Element), Element ID (ML IE) indicating the type of element, Number of Multi Links indicating the number of links in which multiple links can be set, and Ch. No. indicating the channel numbers of the links including the number of multiple links.

This configuration includes, as parameters, BAR Sequence for identifying the sequence of a block ACK request to which the present technology is applied, Feedback Timing indicating the feedback timing of the block ACK request (BAR), and Feedback MSDU Count indicating the feedback condition for the block ACK request (BAR). Further, the parameters include parameters such ACK Bitmap Length indicating the bitmap length of the ACK frame, ACK/NACK indicating whether the information to be returned in a block ACK (BA) is ACK information or NACK information, Buffer Size indicating the capacity of the buffer, Available Sequence Number for identifying an available sequence number space, and Multi Links Retransmit to be used in a case where retransmission is performed in multiple links.

That is, as for the various kinds of parameters described herein, a value of a desired parameter may be written in Multi-Link Setup Request, and a parameter value determined as Multi-Link Setup Response may be written and exchanged. Note that, in FIG. 18, Ch. No. includes the channel numbers of the links. However, the channel numbers may correspond to the multiple links, and the link numbers may be included instead of the channel numbers. Alternatively, instead of the channel numbers or the link numbers, parameters including the channel number at the center frequency and channel width information may be included.

(Multi-Link Setting Process)

Next, a flow of a multi-link setting process is described with reference to the flowchart shown in FIGS. 19 and 20.

This flowchart shows a flow of a setup operation till various parameters are exchanged and set in a case where a multi-link operation is performed in both the transmission-side communication device 10Tx and the reception-side communication device 10Rx.

First, a communication device 10 acquires information about links that can be set in a case where a multi-link operation is performed (S101). In a case where the communication device 10 is the data transmission-side communication device 10Tx (Yes in S102), if transmission in a multi-link operation can be performed (Yes in S103), multiple links for transmission of data such as the bandwidth of the multiple links to be used for data transmission and the transmission parameters are then set (S104).

Further, if it is necessary to return ACK information at an early stage because of the characteristics of the application or the allowable delay parameter (Yes in S105), the transmission-side communication device 10Tx sets a condition for transmitting a block ACK request (BAR) and various kinds of parameters to be used for exchanging the block ACK request (BAR) with a block ACK (BA) (S106), and performs link settings so that a block ACK request frame can be transmitted in any desired link that operates in the multi-link operation (S107).

Note that, if it is not necessary to return the ACK information at an early stage (No in S105), the processes in steps S106 and S107 are skipped. A series of settings is then repeated until these settings are completed for all links (No in S108, S103 to S107).

When all the links have been set (Yes in S108), the transmission-side communication device 10Tx transmits a multi-link setup request to the reception-side communication device 10Rx (S109), and receives a multi-link setup response to the request (S110).

When receiving the multi-link setup response (Yes in S110), the transmission-side communication device 10Tx acquires parameter information about the multi-link setup from the reception-side communication device 10Rx (S111), and performs the settings for transmission of the data frame and transmission of the block ACK request frame as its own multi-link operation (S112). When the process in step S112 is completed, the multi-link setting process on the transmission side comes to an end.

In a case where the communication device 10 is the data reception-side communication device 10Rx in step S102 (No in S102), on the other hand, the process moves on to step S113 in FIG. 20, and a multi-link setup request is received from the transmission-side communication device 10Tx (S113).

When the multi-link setup request is received (Yes in S113), the reception-side communication device 10Rx acquires parameter information about the multi-link setup from the transmission-side communication device 10Tx (S114), acquires the parameters of the multiple links for data reception (S115), and determines whether or not its own multi-link operation is possible (S116).

If a multi-link operation is possible (Yes in S116), the reception-side communication device 10Rx calculates parameters that can be handled by itself, and sets the calculated parameters as the parameters for data reception (S117). Note that, in a case where a multi-link operation is not possible (No in S116), the process in step S117 is skipped.

The reception-side communication device 10Rx acquires various kinds of parameters to be used for exchanging a block ACK request (BAR) with a block ACK (BA) (S118). If the exchange sequence of a block ACK request (BAR) and a block ACK (BA) is possible (Yes in S119), the reception-side communication device 10Rx then performs a setting capable of handling the block ACK request frame received promptly in any link (S120), and sets parameters of the block ACK (BA) in response to the block ACK request (BAR) (S121). Note that, if the exchange sequence of a block ACK request (BAR) and a block ACK (BA) is not possible (No in S119), the processes in steps S120 and S121 are skipped.

In a case where the setup of a multi-link operation is completed after the setting of these parameters is completed (Yes in S122), the reception-side communication device 10Rx transmits a multi-link setup response to the transmission-side communication device 10Tx (S123), and performs the settings for reception of a data frame and reception of the block ACK request frame as its own multi-link operation (S124).

In a case where the process in step S124 ends or where the multi-link operation is not performed (No in S122), the process returns to FIG. 19, and the multi-link setting process on the reception side comes to an end. Note that, in a case where the reception-side communication device 10Rx does not receive any multi-link setup request (No in S113), the process returns to step S101 in FIG. 19, and the subsequent processes are performed.

The above is the flow of a multi-link setting process.

(Process on the Data Transmission Side)

Next, a flow of a process to be performed on the data transmission side by the transmission-side communication device 10Tx is described with reference to a flowchart shown in FIGS. 21 and 22.

In a case where transmission data is received by the interface 101 (Yes in S201), the transmission-side communication device 10Tx sets a transmission sequence number space (S202), and stores the transmission data into the transmission buffer 102 (S203).

In a case where transmission data has not been received (No in S201), on the other hand, when an instruction for data transmission is issued (Yes in S204), the transmission-side communication device 10Tx starts a predetermined access control procedure in the multiple links for data frame transmission and block ACK request frame transmission (S205). In a case where the process in step S203 or S205 has been completed, or where a data transmission instruction has not been issued (No in S204), the process moves on to step S206. In a case where transmission in a desired link is not possible (No in S206), the process then returns to step S201, and the subsequent processes are repeated.

If transmission has become possible in a desired link (Yes in S206), on the other hand, when the setting for performing data transmission has been completed (Yes in S207), the transmission-side communication device 10Tx performs a process for transmitting an A-MPDU (S208 to S210). Specifically, the parameter information necessary for forming an A-MPDU is obtained (S208), the data yet to be transmitted is obtained in accordance with the configuration to construct the A-MPDU (S209), and the A-MPDU is transmitted as a data frame in the link to be used (S210). After the process in step S210 is completed, the process moves on to the step S211 in FIG. 22.

In a case where it is not necessary to transmit a block ACK request frame after transmitting the A-MPDU frame (Yes in S211), the process moves on to step S216, and the transmission-side communication device 10Tx waits for an ACK frame from the reception-side communication device 10Rx (S216).

In a case where it is necessary to transmit a block ACK request frame (No in S211), on the other hand, when the conditions for transmission of a block ACK request frame are satisfied (Yes in S212), the transmission-side communication device 10Tx performs a process for transmitting a block ACK request frame (S213 to S215). Specifically, the parameters necessary for exchanging a block ACK request (BAR) and a block ACK (BA) are obtained (S213), and a block ACK request (BAR) is constructed in accordance with the configuration (S214), and is transmitted as a block ACK request frame in the link being used (S215).

Also, in a case where it is determined in step S207 in FIG. 21 that data transmission is not to be performed (No in S207), when the conditions for transmission of a block ACK request frame are satisfied (Yes in S212), a process for transmitting a block ACK request frame is performed (S213 to S215). Note that, if the conditions for transmission of a block ACK request frame are not satisfied (No in S212), the process in steps S213 to S215 is skipped.

In a case where a block ACK frame is received after the block ACK request frame is transmitted (Yes in S216), if the reception-side communication device 10Rx has successfully received and collected all the data on the basis of the received block ACK frame (Yes in S217), the transmission-side communication device 10Tx releases the transmission sequence number space (S218), and ends the series of processes on the data transmission side.

In a case where there is data undelivered to the reception-side communication device 10Rx (No in S217), on the other hand, the transmission-side communication device 10Tx identifies the data with the sequence number to be NACK (S219), and specifies the method for performing a data retransmission process (S220). The process then returns to step S208 in FIG. 21, and an A-MPDU is formed, and data retransmission is performed (S208 to S210). In a case where any block ACK frame is not received even after a predetermined time has passed (No in S216), on the other hand, the process returns to step S212, and a block ACK request frame is retransmitted to request a block ACK frame.

The above is the flow of a process on the data transmission side.

(Process on the Data Reception Side)

Next, a flow of a process to be performed on the data reception side by the reception-side communication device 10Rx is described with reference to a flowchart shown in FIGS. 23 and 24.

In a case where the reception-side communication device 10Rx has waited for data in the multiple links being used on the basis of a predetermined multilink setup, and detected a predetermined preamble (Yes in S301), the reception-side communication device 10Rx acquires each MPDU in accordance with the frame configuration of the A-MPDU (S302).

When receiving the MPDUs without an error (No in S303), the reception-side communication device 10Rx then stores the sequence numbers added to the MPDUs as ACK information (S304), and stores the received data into the reception buffer 112 (S305). In a case where there is an error among the MPDUs (Yes in S303), on the other hand, the reception-side communication device 10Rx stores the sequence number added to the MPDU as NACK information (S306), and adds up the number of MPDUs that have become NACK (S307). In a case where the process in step S305 or S307 has been completed, or where data reception has not been detected yet (No in S301), the process moves on to step S308.

In a case where a block ACK request frame has been received in a desired link (Yes in S308), or in a case where a predetermined response return condition is satisfied, which is a case where the timing to return a predetermined ACK frame has come (Yes in S309), the reception-side communication device 10Rx performs a process for transmitting a block ACK frame (S310 to S312). Specifically, the ACK information and the NACK information that have been collected by that time are acquired (S310), and a block ACK (BA) in a predetermined format is constructed (S311), and is transmitted as a block ACK frame (S312).

Note that the process of returning a block ACK frame in a desired link is designed to be performed as appropriate even during decoding of the MPDUs of the A-MPDU. In a case where the process in step S312 has been completed, or where the predetermined response return condition is not satisfied (No in S309), the process moves on to step S313 in FIG. 24. In a case where the end of the A-MPDU does not arrive in the reception-side communication device 10Rx (No in S313), the process returns to step S302 in FIG. 23, and the MPDU decoding process is continuously performed in the configuration.

In a case where the end of the A-MPDU has arrived (Yes in S313), on the other hand, when it is necessary to return an ACK frame immediately after that (Yes in S314), the reception-side communication device 10Rx acquires the ACK information and the NACK information that have been collected by that time as necessary, and transmits a block ACK frame (S315). Note that, if it is not necessary to return an ACK frame (No in S314), the process in step S315 is skipped.

Further, in a case where the preset conditions for outputting data are satisfied (Yes in S316), the reception-side communication device 10Rx acquires, from the reception buffer 112, the received data that has been collected by that time (S317), and outputs the data to the device connected thereto via the interface 101 (S318). In a case where the output of all the data has been completed (Yes in S319), the series of processes on the data reception side then comes to an end.

Note that, in a case where the preset conditions for outputting data are not satisfied (No in S316), or in a case where the output of all the data has not been completed (No in S319), the process returns to step S301 in FIG. 23, and the series of processes on the data reception side is repeated.

The above is the flow of a process on the data reception side.

As described above, in the transmission-side communication device 10Tx to which the present technology is applied, when an A-MPDU frame including aggregated data is transmitted with the use of a first link, a block ACK request frame of the data is transmitted with the use of a second link, and a block ACK frame is received from the reception-side communication device 10Rx that has received the A-MPDU frame. On the other hand, in the reception-side communication device 10Rx to which the present technology is applied, when an A-MPDU frame including aggregated data is received from the transmission-side communication device 10Tx using the first link, a block ACK request frame is received with the use of the second link, a block ACK frame including an acknowledgment regarding the collected data is generated on the basis of the received block ACK request frame, and the generated block ACK frame is transmitted to the transmission-side communication device 10Tx.

As a result, the reception-side communication device 10Rx can return a block ACK frame corresponding to the block ACK request frame before the end of the A-MPDU frame arrives, and thus, the transmission-side communication device 10Tx can identify the data that needs to be retransmitted at an earlier stage, on the basis of the returned block ACK frame.

Also, according to the present technology, in a case where the transmission-side communication device 10Tx satisfies a predetermined condition of a block ACK request frame to identify the undelivered data at any timing during a multilink operation, the block ACK request frame is transmitted in a selected available link at that time, and, in response to the block ACK request frame, the reception-side communication device 10Rx can return a block ACK frame including ACK information about the data that has been successfully decoded by that time in all links. The block ACK request frame can include information related to a link including the data requesting a block ACK among the links used for transmission in the multi-link operation, information related to the range of sequence numbers from a sequence number that does not require a return of a block ACK to a sequence number for which a block ACK is to be returned, and information related to the bitmap length of a block ACK.

Further, according to the present technology, it is possible to obtain ACK information at any timing by transmitting a block ACK request frame from the transmission-side communication device 10Tx using any desired link during a multi-link operation. That is, the transmission-side communication device 10Tx transmits a block ACK request frame using a desired link as necessary, so that the reception-side communication device 10Rx can obtain a method for receiving ACK information about the data that has been successfully collected by that timing. Thus, even when an A-MPDU frame is being transmitted in a multi-link operation, the transmission-side communication device 10Tx can acquire, from the reception-side communication device 10Rx, the ACK information corresponding to the data receipt status regarding each of the MPDUs that have been collected by that timing.

Even in a case where a long A-MPDU frame is constructed and transmitted without advance determination of the amount of information to be transmitted in one link, the transmission-side communication device 10Tx can acquire ACK information from the reception-side communication device 10Rx in the middle of the A-MPDU frame. For example, in a case where the transmission-side communication device 10Tx transmits data of a real-time application, the time before retransmission of the data can be shortened, and thus, a more effective retransmission method can be obtained when a short latency is required.

Also, the transmission-side communication device 10Tx can search for a link whose use cannot be grasped by the reception-side communication device 10Rx, for example, by incorporating the information about the links to be used in the multi-link operation into a block ACK request frame. Alternatively, by incorporating the sequence number to be discarded by the transmission-side communication device 10Tx into the block ACK request frame, a method for clearing the buffer of the reception-side communication device 10Rx is obtained. That is, it is possible to eliminate a state in which undelivered data is present, and the sequence number space cannot be reused.

Further, the transmission-side communication device 10Tx writes, into a block ACK request frame, the bitmap information length of the ACK information to be returned in a block ACK frame, to obtain a method for setting the minimum required length of the block ACK frame.

In a case where the transmission-side communication device 10Tx ends data transmission using a plurality of links, a block ACK request frame is transmitted after a certain time elapses, so that a block ACK frame is not instantly transmitted from the reception-side communication device 10Rx, and frequent transmission of a block ACK frame can be prevented. Furthermore, the transmission-side communication device 10Tx transmits block ACK request frames at predetermined intervals, to obtain a method for efficiently acquiring ACK information.

2. Modifications

Other Example Configurations

As described above, a transmission-side communication device 10Tx can be formed as the access point AP10 (a base station), for example, and a reception-side communication device 10Rx can be formed as a communication terminal STA10 (a terminal station), for example. However, a transmission-side communication device 10Tx or a reception-side communication device 10Rx may be formed as a part (a wireless communication module, a wireless chip, or the like, for example) of a device (a component) forming the access point AP10 or a communication terminal STA10.

Further, a reception-side communication device 10Rx formed as a communication terminal STA10 can be designed as an electronic device having a wireless communication function, such as a smartphone, a tablet-type terminal, a game machine, a portable telephone, a personal computer, a digital camera, a television receiver, a wearable terminal, or a speaker device, for example. Moreover, the communication terminal STA10 may be a device that supports only data transmission such as a controller that transmits command data according to a user's operation, or a device that supports only data reception such as a display device that receives and displays video data.

(Configuration of a Computer)

The processes in the respective steps shown in the flowcharts described above can be performed by hardware or software. In a case where the series of processes is to be performed by software, the program forming the software is installed into the computer of each device.

Here, in this specification, the processes to be performed by the computer in accordance with the program are not necessarily performed in chronological order according to the sequences shown in the flowcharts. That is, the processes to be performed by the computer in accordance with the program include processes to be performed in parallel or independently of one another (such as parallel processes or object-based processes, for example).

Also, the program may be executed by one computer (processor), or may be executed by a plurality of computers in a distributed manner. Further, the program may be transferred to a remote computer, and be executed therein.

Furthermore, in this specification, a system means an assembly of a plurality of components (devices, modules (parts), and the like), and not all the components need to be provided in the same housing.

Note that embodiments of the present technology are not limited to the above embodiments, and various modifications may be made to them without departing from the scope of the present technology. Also, the advantageous effects described in this specification are merely examples, and the advantageous effects of the technology are not limited to them and may include other effects.

Also, the respective steps described with reference to the flowcharts described above can be carried out by one device, or can be shared among a plurality of devices. Further, in a case where a plurality of processes is included in one step, the plurality of processes included in the one step can be performed by one device, or can be shared among a plurality of devices.

Note that the present technology may also be embodied in the configurations described below.

(1)

A communication device including a control unit that performs control to:

exchange frames with another communication device by wireless communication using a plurality of links;

when transmitting a data frame including aggregated data using a first link, transmit an acknowledgment request frame for the data, using a second link; and receive an acknowledgment frame in response to the acknowledgment request frame from the another communication device that has received the data frame.

(2)

The communication device according to (1), in which the control unit transmits the acknowledgment request frame after a predetermined time has elapsed since the start of the transmission of the data frame and before the end of the transmission of the data frame.

(3)

The communication device according to (1), in which the control unit transmits the acknowledgment request frame after transmitting a predetermined amount of data in the data included in the data frame.

(4)

The communication device according to any one of (1) to (3), in which the control unit transmits the acknowledgment request frame including identification information for identifying data that requires an acknowledgment of receipt from the another communication device.

(5)

The communication device according to (4), in which the acknowledgment request frame includes information for identifying a sequence number as the identification information.

(6)

The communication device according to (4), in which the acknowledgment request frame includes information regarding an amount of data that needs to be retransmitted, as the identification information.

(7)

The communication device according to any one of (1) to (6), in which, in a case where data that needs to be retransmitted to the another communication device is identified on the basis of the received acknowledgment frame, the control unit transmits the identified data before transmission of the data frame ends.

(8)

The communication device according to any one of (1) to (7), in which, in a case where data that needs to be retransmitted to the another communication device is identified on the basis of the received acknowledgment frame, the control unit transmits the identified data, using an appropriate link.

(9)

The communication device according to any one of (1) to (8), in which, in a case where the control unit has identified a link in which a failure has occurred on the basis of the received acknowledgment frame, the control unit suspends transmission of the data frame using the link.

(10)

The communication device according to any one of (1) to (9), in which the control unit incorporates information indicating an acknowledgment request included in the acknowledgment request frame into data, and transmits the data.

(11)

A communication method implemented by a communication device to:

exchange frames with another communication device by wireless communication using a plurality of links;

when transmitting a data frame including aggregated data using a first link, transmit an acknowledgment request frame for the data, using a second link; and receive an acknowledgment frame in response to the acknowledgment request frame from the another communication device that has received the data frame.

(12)

A communication device including a control unit that performs control to:

exchange frames with another communication device by wireless communication using a plurality of links;

when receiving a data frame including aggregated data using a first link from another communication device, receive an acknowledgment request frame for the data, using a second link;

generate an acknowledgment frame including an acknowledgment of the data that has been collected, on the basis of the received acknowledgment request frame; and transmit the generated acknowledgment frame to the another communication device that has transmitted the data frame.

(13)

The communication device according to (12), in which the control unit generates the acknowledgment frame, on the basis of a parameter included in the acknowledgment request frame.

(14)

The communication device according to (13), in which the control unit generates the acknowledgment frame, on the basis of identification information for identifying a sequence number, the identification information being included in the acknowledgment request frame.

(15)

The communication device according to any one of (12) to (14), in which the control unit discards received data, on the basis of identification information for identifying a sequence number, the identification information being included in the acknowledgment request frame.

(16)

The communication device according to any one of (12) to (15), in which, when the data frame has been received, the control unit receives data that needs to be retransmitted, using an appropriate link, before reception of the data frame ends.

(17)

The communication device according to any one of (12) to (16), in which the control unit generates the acknowledgment frame including bitmap information indicating an acknowledgment of receipt, on the basis of information regarding data that needs to be retransmitted.

(18)

The communication device according to any one of (12) to (16), in which, on the basis of information regarding data that needs to be retransmitted, the control unit generates the acknowledgment frame including identification information for identifying the data.

(19)

The communication device according to any one of (12) to (18), in which, in a case where received data includes information indicating an acknowledgment request, the control unit generates the acknowledgment frame, and transmits the generated acknowledgment frame, using an appropriate link.

(20)

A communication method implemented by a communication device to:

exchange frames with another communication device by wireless communication using a plurality of links;

when receiving a data frame including aggregated data using a first link from another communication device, receive an acknowledgment request frame for the data, using a second link;

31 generate an acknowledgment frame including an acknowledgment of the data that has been collected, on the basis of the received acknowledgment request frame; and transmit the generated acknowledgment frame to the another communication device that has transmitted the data frame.

REFERENCE SIGNS LIST 1-1 Wireless LAN system
10 Communication device
10Tx Transmission-side communication device
10Rx Reception-side communication device
11 Network connection module
12 Information input module
13 Device control module
14 Information output module
15 Wireless communication module
101 Interface
102 Transmission buffer
103 Transmission sequence management unit
104 Transmission frame construction unit
105 Multi-link management unit
106 Access control unit
107, 107-1 to 107-4 Transmission signal processing unit
108 Transmission/reception antenna unit
109, 109-1 to 109-4 Reception signal processing unit
110 Reception frame analysis unit
111 Reception sequence management unit
112 Reception buffer.

The invention claimed is:

1. A communication control device comprising control circuitry that performs control to:

communicate frames with another communication device by wireless communication using a plurality of links;

when transmitting a data frame including aggregated data using a first link, transmit an acknowledgment request frame for the data, using a second link; and receive an acknowledgment frame in response to the acknowledgment request frame from the another communication device that has received the data frame, wherein, in a case where data that needs to be retransmitted to the another communication device is identified on a basis of the received acknowledgment frame, the control circuitry performs control to transmit the identified data before transmission of the data frame ends.

2. The communication control device according to claim 1, wherein the control circuitry transmits the acknowledgment request frame after a predetermined time has elapsed since a start of transmission of the data frame and before an end of the transmission of the data frame.

3. The communication control device according to claim 1, wherein the control circuitry transmits the acknowledgment request frame after transmitting a predetermined amount of data in the data included in the data frame.

4. The communication control device according to claim 1, wherein the control circuitry transmits the acknowledgment request frame including identification information for identifying data that requires an acknowledgment of receipt from the another communication device.

5. The communication control device according to claim 4, wherein

32 the acknowledgment request frame includes information for identifying a sequence number as the identification information.

6. The communication control device according to claim 4, wherein the acknowledgment request frame includes information regarding an amount of data that needs to be retransmitted, as the identification information.

7. The communication control device according to claim 1, wherein, in a case where data that needs to be retransmitted to the another communication device is identified on a basis of the received acknowledgment frame, the control circuitry transmits the identified data, using a determined link.

8. The communication control device according to claim 1, wherein, in a case where the control circuitry has identified a link in which a failure has occurred on a basis of the received acknowledgment frame, the control circuitry suspends transmission of the data frame using the link.

9. The communication control device according to claim 1, wherein the control circuitry incorporates information indicating an acknowledgment request included in the acknowledgment request frame into data, and transmits the data.

10. A communication method implemented by a communication control device to:

perform control to:

communicate frames with another communication device by wireless communication using a plurality of links;

when transmitting a data frame including aggregated data using a first link, transmit an acknowledgment request frame for the data, using a second link; and receive an acknowledgment frame in response to the acknowledgment request frame from the another communication device that has received the data frame, wherein, in a case where data that needs to be retransmitted to the another communication device is identified on a basis of the received acknowledgment frame, the identified data is transmitted before transmission of the data frame ends.

11. A communication device comprising control circuitry that performs control to:

communicate frames with another communication device by wireless communication using a plurality of links;

when receiving a data frame including aggregated data using a first link from another communication device, receive an acknowledgment request frame for the data, using a second link;

generate an acknowledgment frame including an acknowledgment of the data that has been collected, on a basis of the received acknowledgment request frame; and transmit the generated acknowledgment frame to the another communication device that has transmitted the data frame, wherein, when the data frame has been received, the control circuitry receives data that needs to be retransmitted, using a determined link, before reception of the data frame ends.

12. The communication device according to claim 11, wherein the control circuitry generates the acknowledgment frame, on a basis of a parameter included in the acknowledgment request frame.

13. The communication device according to claim 12, wherein the control circuitry generates the acknowledgment frame, on a basis of identification information for identifying a sequence number, the identification information being included in the acknowledgment request frame.

14. The communication device according to claim 11, wherein the control circuitry discards received data, on a basis of identification information for identifying a sequence number, the identification information being included in the acknowledgment request frame.

15. The communication device according to claim 11, wherein the control circuitry generates the acknowledgment frame including bitmap information indicating an acknowledgment of receipt, on a basis of information regarding data that needs to be retransmitted.

16. The communication device according to claim 11, wherein, on a basis of information regarding data that needs to be retransmitted, the control circuitry generates the acknowledgment frame including identification information for identifying the data.

17. The communication device according to claim 11, wherein, in a case where received data includes information indicating an acknowledgment request, the control circuitry generates the acknowledgment frame, and transmits the generated acknowledgment frame using the determined link.

18. A communication method implemented by a communication device to:

communicate frames with another communication device by wireless communication using a plurality of links;

when receiving a data frame including aggregated data using a first link from another communication device, receive an acknowledgment request frame for the data, using a second link;

generate an acknowledgment frame including an acknowledgment of the data that has been collected, on a basis of the received acknowledgment request frame; and transmit the generated acknowledgment frame to the another communication device that has transmitted the data frame, wherein, when the data frame has been received, data that needs to be retransmitted is received, using a determined link, before reception of the data frame ends.

* * * * *